US006638165B2

(12) United States Patent
Uchiyama et al.

(10) Patent No.: US 6,638,165 B2
(45) Date of Patent: Oct. 28, 2003

(54) VIRTUAL IMAGE/REAL IMAGE SUPERIMPOSING AND DISPLAYING APPARATUS, AND SLOT MACHINE

(75) Inventors: Takashi Uchiyama, Tokyo (JP); Nobuhiro Goto, Tokyo (JP); Ryosuke Toriyama, Tokyo (JP); Shingo Yasuda, Tokyo (JP); Nobuhito Muto, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 10/011,764

(22) Filed: Dec. 11, 2001

(65) Prior Publication Data

US 2002/0077172 A1 Jun. 20, 2002

(30) Foreign Application Priority Data

Dec. 15, 2000 (JP) ....................................... 2000-382828

(51) Int. Cl.[7] ................................................ A63F 13/00
(52) U.S. Cl. ............................ 463/20; 463/13; 273/292
(58) Field of Search ............................ 273/292, 138.1, 273/139; 463/20, 13, 30

(56) References Cited

U.S. PATENT DOCUMENTS 6,036,189 A * 3/2000 Gomez et al. .......... 273/118 R
6,047,962 A * 4/2000 Popadiuk ................ 273/119 A
6,135,884 A * 10/2000 Hedrick et al. ............... 463/20
6,315,666 B1 * 11/2001 Mastera et al. ............... 463/31
6,368,216 B1 * 4/2002 Hedrick et al. ............... 463/20
6,383,076 B1 * 5/2002 Tiedeken ..................... 463/40
6,450,884 B1 * 9/2002 Seelig et al. .................. 463/17
6,464,581 B1 * 10/2002 Yoseloff et al. ............... 463/20
6,517,433 B2 * 2/2003 Loose et al. .................. 463/20
6,517,437 B1 * 2/2003 Wells et al. .................. 463/30

FOREIGN PATENT DOCUMENTS

JP 07-136345 * 5/1995 ............. A63F/9/22
JP 08-309023 * 11/1996 ............. A63F/9/00
JP 08-323037 * 12/1996 ............. A63F/9/00
JP 8-323037 12/1996
JP 11-114221 * 4/1999 ............. A63F/9/22
JP 11-151352 * 6/1999 ............. A63F/7/02

OTHER PUBLICATIONS

Pub. No.: US2003/0069064 A1—L. H. Ainsworth—Gaming Machine—Apr. 10, 2003.*
Pub. No.: US2003/0073484 A1—J. H. Lo—Gaming Device Display Having a Digital Image and Silkscreen Colors and Process for Making Same—Apr. 17, 2003.*

* cited by examiner

*Primary Examiner*—Benjamin H. Layno
*Assistant Examiner*—Dolores R Collins
(74) *Attorney, Agent, or Firm*—Sughrue Mion, PLLC

(57) ABSTRACT

A virtual image/real image superimposing and displaying apparatus for displaying a virtual image and an actual substance includes image display (13) for displaying an image from which a virtual image originates; a half mirror (1*g*) which forms the virtual image (7) on the basis of the image displayed by the image display (13); a communications section (9) which enables movement of an actual substance 1*m* from a back side of the virtual image to a front side of the same so as to penetrate therethrough; and a mechanical reel portion (6) having a plurality of spinning drums (6*d*1, 6*d*2, and 6*d*3) which have marks, such as numbers and symbols, printed on a circumferential surface thereof and spin independently of each other. The actual substance 1*m* is paid out so as to penetrate through a virtual image from its back to front and becomes visible only when the actual substance is moved to the front side of the virtual image.

20 Claims, 12 Drawing Sheets

FIG. 10A

| STEP | GAME LAMP | NUMBER OF MEDALS PAID OUT |
|---|---|---|
| 12 | ◯ | 125 |
| 11 | ○ | 10 |
| 10 | ○ | 10 |
| 9 | ◯ | 75 |
| 8 | ○ | 10 |
| 7 | ○ | 10 |
| 6 | ◯ | 50 |
| 5 | ○ | 10 |
| 4 | ○ | 10 |
| 3 | ◯ | 25 |
| 2 | ○ | 10 |
| 1 | ○ | 10 |
| 0 | | |

FIG. 10B

| STEP | GAME LAMP | NUMBER OF MEDALS PAID OUT |
|---|---|---|
| 15 | ◯ | 125 |
| 14 | ○ | 10 |
| 13 | ○ | 10 |
| 12 | ○ | 10 |
| 11 | ○ | 10 |
| 10 | ◯ | 75 |
| 9 | ○ | 10 |
| 8 | ○ | 10 |
| 7 | ○ | 10 |
| 6 | ◯ | 50 |
| 5 | ○ | 10 |
| 4 | ○ | 10 |
| 3 | ◯ | 25 |
| 2 | ○ | 10 |
| 1 | ○ | 10 |
| 0 | | |

VIRTUAL IMAGE/REAL IMAGE SUPERIMPOSING AND DISPLAYING APPARATUS, AND SLOT MACHINE

BACKGROUND OF THE INVENTION

The present invention relates to a display device for displaying images for a player and to a slot machine. More specifically, the present invention relates to a virtual image/real image superimposing and displaying apparatus for superimposing a virtual image on an real image and displaying the thus-superimposed images, as well as to a slot machine for effecting progress in a game through use of the displaying apparatus.

A hit-the-target game machine described in Japanese Patent Application Laid-Open No. 323037/1996 is a game machine which uses a video display device employing virtual images.

In the hit-the-target machine, a target image appearing on a screen of a cathode ray tube (CRT) is displayed on a display by superimposing, with the aid of a half mirror, a virtual image of a hitting table on a mirror image of a hammer held by a player.

At the time of a game, the player plays the game while watching a screen of the video display device. The player swings his hammer down such that the mirror image of the hammer hits a target image.

When the player has successfully hit the target image, an impact sensor detects the hitting action and outputs a signal. On the basis of the outputted signal, a video controller switches the target image appearing on the CRT to a hit effect image.

Further, Japanese Patent Application Laid-Open No. 114221/1999 describes a composite image display device, a gaming machine, and a bowling game machine.

The composite image display device superimposes an actual ball on a ball of a video image and displays the thus-superimposed ball to an observer. The composite image display device includes a CRT display for displaying an image and a mirror for forming a virtual reflected image of the image.

At the time of a game, an actual ball tossed by a player rolls over a travel surface, passes through the mirror, and travels to a deeper position relative to the mirror.

When the actual ball passes through a half mirror portion of the mirror, a video-image ball having the same appearance as that of the actual ball appears, and the actual ball is replaced with the video-image ball.

When the actual ball has gone behind the mirror, movement of the actual ball is succeeded by movement of the video-image ball serving as a virtual reflected image.

As mentioned above, the image display device for use with a hit-the-target gaming machine effects a game through use of a mirror image of a hammer and a background image by means of simply a half mirror. The hit-the-target gaming machine is substantially equal to a commonly-known whack-a-mole game machine, except that an real image employed in the hit-the-mole gaming machine is replaced with a video expression. An image to be displayed for a player in the hit-the-target gaming machine is a warmed-over version of an old game and is simple.

In the above-described composite image display device, the gaming machine and the bowling gaming machine, after the actual ball tossed by the player has gone behind the mirror, travel of the actual ball is succeeded by movement of a video-image ball serving as a virtual reflected image. By means of spatially separating an actual portion from a virtual reflected image portion, there is yielded an advantage of reducing the space occupied by the gaming machine and facilitating the gaming machine. However, an actual substance used in a gaming machine is replaced with a mere video expression. Hence, as in the case of the image display device, the composite image display device, the gaming machine and the bowling gaming machine are stale and simple and fail to improve the entertainment characteristic of the gaming machine.

SUMMARY OF THE INVENTION

The present invention has been conceived in light of the above description and is aimed at providing a virtual image/real image superimposing and displaying apparatus which achieves fusion of an image and an actual substance, by means of combining together the fantasy of an image and the three-dimensionality and realism of an actual substance. Further, the present invention is aimed at providing a slot machine which enables fertile video expression through use of the superimposing and displaying apparatus and improves an entertainment characteristic of a game.

In order to solve the aforesaid object, the invention is characterized by having the following arrangement.

(1) A virtual image/real image superimposing and displaying apparatus for displaying a virtual image and an actual substance, comprising:
  - an image display for displaying an image which is a original of the virtual image;
  - a half mirror which forms the virtual image on the basis of the image displayed by the image display; and
  - a junction section which enables movement of the actual substance from a back side of the virtual image to a front side of the virtual image so as to penetrate therethrough,
  - wherein the actual substance becomes visible only when the actual substance is moved to a front side of the virtual image.

(2) The virtual image/real image superimposing and displaying apparatus according to (1), wherein a background of a virtual image display area in which the virtual image is displayed front of the actual substance is of dark color.

(3) A virtual image/real image superimposing and displaying apparatus for displaying a virtual image and an actual substance, comprising:
  - an image display for displaying an image which is a original of the virtual image;
  - a half mirror which forms the virtual image on the basis of the image displayed by the image display;
  - an actual substance which is disposed so as to extend from a front side of the virtual image to a back side of the virtual image;
  - an actual substance display area in which a predetermined portion of the actual substance is disposed front of the virtual image;
  - a virtual image display area in which the virtual image is disposed front of another portion of the actual substance; and
  - an image controller for moving an image of the virtual image between the actual substance display area and the virtual image display area.

(4) The virtual image/real image superimposing and displaying device according to (3), wherein a background of a virtual image display area in which the virtual image is displayed front of the actual substance is of dark color.

(5) The virtual image/real image superimposing and displaying device according to (3), further comprising:

a dark color section provided in at least a portion of the actual substance display area in which a predetermined portion of the actual substance is disposed front of the virtual image, wherein the virtual image is displayed on the dark color section.

(6) A virtual image/real image superimposing and displaying apparatus for displaying a virtual image and an actual substance, comprising:

an image display for displaying an image which is a original of the virtual image;

a half mirror which forms the virtual image on the basis of the image displayed by the image display;

an actual substance which is disposed so as to extend from a front side of the virtual image to a back side of the virtual image;

an actual substance display area in which a predetermined portion of the actual substance is disposed front of the virtual image; and a controller for controlling the movement of the actual substance in cooperation with the virtual image.

(7) The virtual image/real image superimposing and displaying device according to (6), wherein a background of a virtual image display area in which the virtual image is displayed front of the actual substance is of dark color.

(8) The virtual image/real image superimposing and displaying device according to (6), further comprising:

a dark color section provided in at least a portion of the actual substance display area in which a predetermined portion of the actual substance is disposed front of the virtual image, wherein the virtual image is displayed on the dark color section.

(9) A slot machine which pays prize values when combination of a plurality of marks represents a winning combination, comprising:

an image display for displaying an image which is a original of a virtual image;

a half mirror which forms the virtual image on the basis of the image displayed by the image display;

a junction section enables movement of prize values from a back side of the virtual image to a front side of the virtual image so as to penetrate therethrough; and a mechanical reel portion having a plurality of spinning drums, each of the spinning drums having the plurality of marks representing at least one of numbers and symbols, printed on a circumferential surface thereof and spinning independently, wherein the prize values are paid from a back side of the virtual image to a front side of the virtual image so as to penetrate through the virtual image, and the prize values become visible only when moving to the front side of the virtual image.

(10) The slot machine according to (9), wherein the mechanical reel portion is disposed so as to extend from the front side of the virtual image to the back side of the same, and movement of the mechanical reel portion is controlled by a reel controller in cooperation with the virtual image.

(11) The slot machine according to claim (9), further comprising:

a image controller which causes at least one of the spinning drums of the mechanical reel portion to be dark and displays the virtual image on the spinning drums.

(12) The slot machine according to (9), further comprising:

a plurality of lamps, each of which defines number of payout prize values, the plurality of lamps being illuminated when the plurality of marks includes a winning combination.

(13) The slot machine according to (12) further comprising a changing image controller for changing the image in response to illumination of the lamps.

(14) A slot machine which pays prize values when a plurality of marks includes a winning combination, comprising:

a gate unit placed in a channel through which the prize values are paid out; and a gate open/close controller for controlling opening and closing action of the gate unit in accordance with progress in a game, wherein the prize values passed through the gate unit are offered to a game player.

(15) The slot machine according to (14), wherein the game open/close controller controls opening and closing action of the gate unit in accordance with the kind of a winning combination included in the plurality of marks.

(16) A slot machine which pays prize values when a plurality of marks has included a winning combination, comprising:

a disk shooter through which a game player shoots a disk;

a start checker unit which allows passage of the disk in a case of a hit of the shot disk and blocks passage of the disk in case of failure of hit of the shot disk;

a passage detector for detecting passage of the disk; and a drum spinning controller which starts spinning of drums of the slot machine when passage of the disk is detected.

(17) The slot machine according to (16), wherein the start checker unit has a start checker which has a plurality of openings and moves in a direction crossing a direction in which a disk is inserted, the openings located close to a disk non-return passage being wide and the openings located close to a disk return passage being narrow.

(18) The slot machine according to (16), further comprising a table member which is disposed between the start checker unit and the disk shooter and can be switched between a horizontal state for guiding a rolling disk to the start check unit and a tilt state for guiding a tipped disk to the disk return passage and the disk non-return passage.

(19) The slot machine according to (18), further comprising a time lamp for indicating whether the table member is in a horizontal state or a tilt state.

(20) The slot machine according to (19), wherein a plurality of lamps are provided as the time lamp, and the number of time lamps illuminated is associated with the tilt state of the table member.

BRIEF DESCRIPTION OF THE DRAWINGS

FIGS. 10A and 10B are diagrams showing relationships between game steps and game lamps relating to the embodiment of a slot machine according to the present invention;

DETAILED DESCRIPTION OF PREFERRED EMBODIMENTS

The present invention will now be described in detail with reference to drawings showing an embodiment of the present invention.

Figure 1:
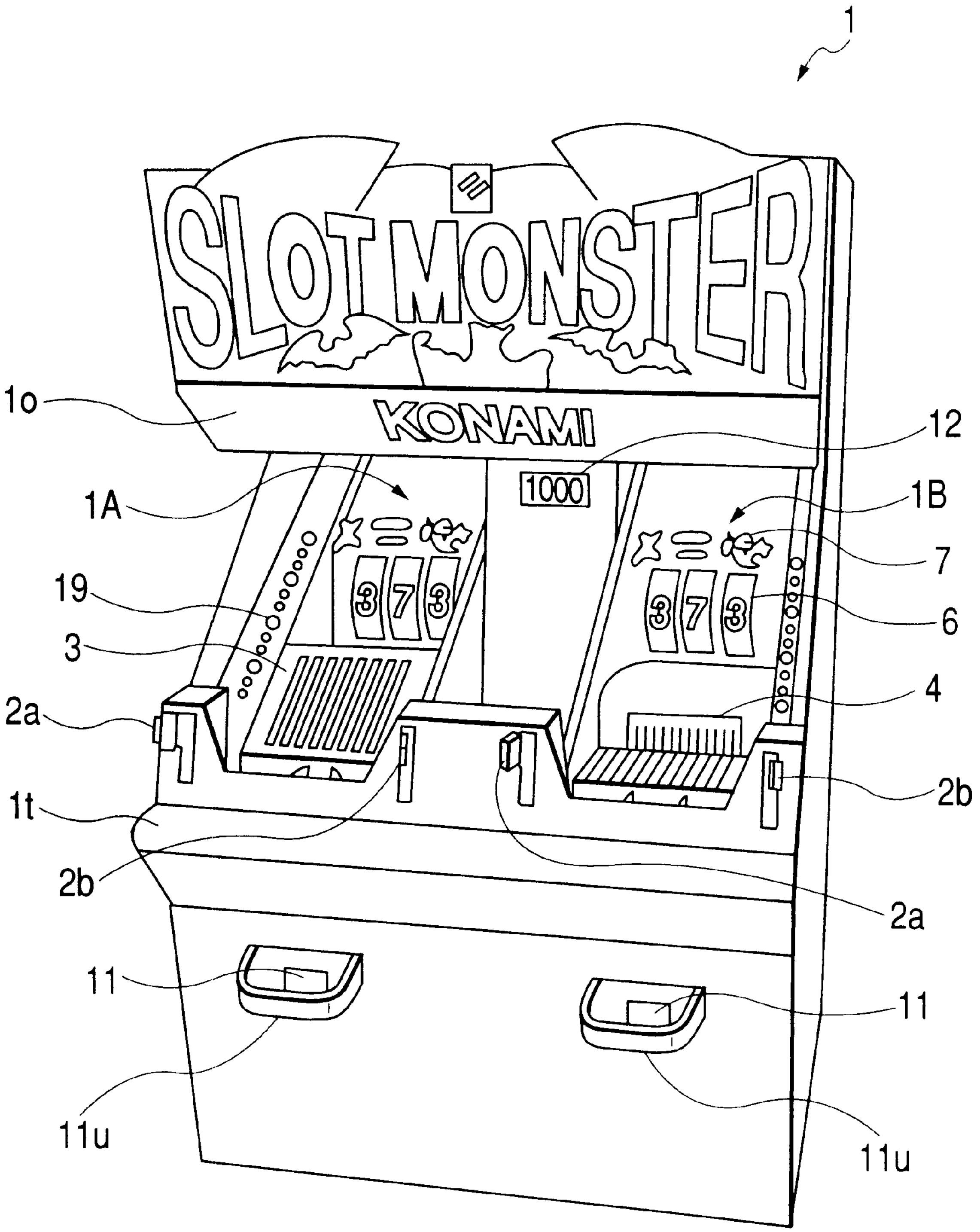
FIG. 1 is an external perspective view showing an embodiment of a slot machine according to the present invention.
Figure 2:
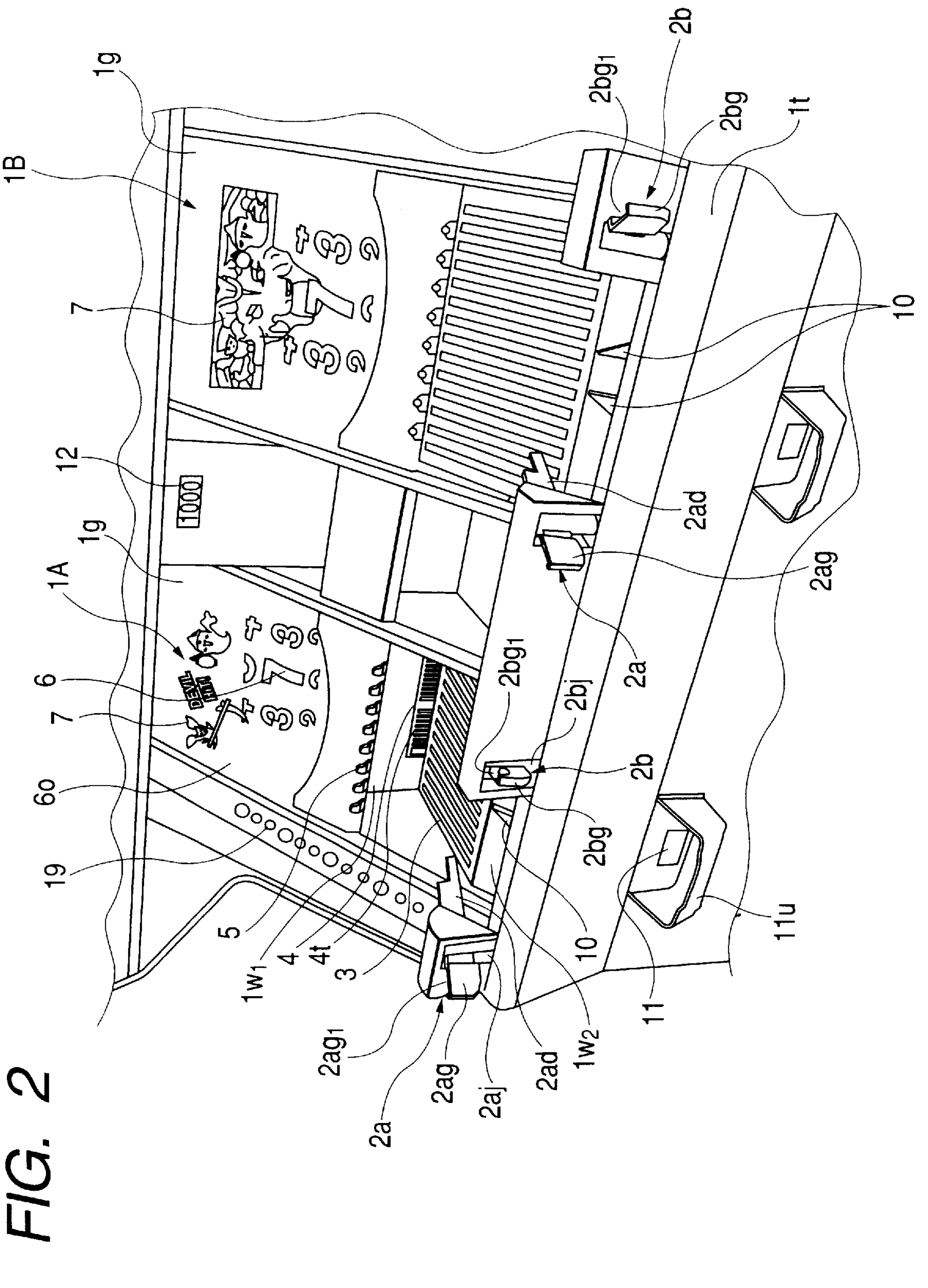
FIG. 2 is a perspective view showing the principal features of the embodiment of the slot machine according to the present invention.

FIG. 1 is an external perspective view showing a slot machine to which the present invention is applied, and FIG. 2 is a perspective view showing the principal features of the slot machine.

In the slot machine according to the present embodiment, a player (a person who plays a game) shoots a disk (coin, token, medal or other disk of a predetermined kind (hereinafter referred to as a disk) ) 1*m* (see FIG. 4) to a disk passage slot 4*t* of a start checker 4 (i.e. start checker unit) from disk shooters 2*a* and 2*b*. When the disk 1*m* has hit and passed through the disk passage slot 4*t* (i.e., an opening), a mechanical reel portion 6 (actual substance) starts spinning.

The mechanical reel portion 6 then automatically stops spinning. When numbers (or symbols) appearing on the mechanical reel portion 6 constitute a predetermined combination (e.g., a winning combination), disks 1*m* are paid out (see FIG. 7). At this time, the disks 1*m* (actual substances moving from the back side of a virtual image 7 to the front side of the same) appear and fall from the virtual image 7 by means of sliding over a slope. The disks that have passed through space between winning gates 10, 10 (gate unit) are acquired by the player.

A horizontal console table 1*t* is formed on the front side of the slot machine (hereinafter called simply as "gaming machine") at a position where the player can readily operate the gaming machine, so as to protrude toward the player.

A transparent half mirror 1*g* which enables a player to ascertain the inside of the gaming machine 1 and which displays a virtual image 7 is placed in an upper half of the front side of the gaming machine 1 so as to tilt backward.

The gaming machine 1 has two lanes; namely, a lane 1A and a lane 1B. Each of the lanes 1A and 1B enables a maximum of two players to play a game.

Although the present embodiment illustrates the gaming machine 1 having two lanes, the number of lanes may be set as required.

Since the lanes 1A and 1B of the gaming machine 1 are completely identical in structure, in the following description only the lane 1A will be described.

The disk shooters 2*a* and 2*b* are provided so as to be opposed to the lane 1A and in upper positions relative to the console table it.

The disk shooter 2*a* has an shooting grip 2*ag* having a disk shooting slot 2*ag*1. The shooting grip 2*ag* is exposed in an upper position relative to the console table It so that a player can manually actuate the grip 2*ag*.

In the disk shooter 2*a,* a disk lead section 2*ad* is formed continually from the shooting grip 2*ag*. The disk lead section 2*ad* is disposed so as to communicate to a game space protected by the half mirror 1*g*.

The disk shooter 2*b* is identical in structure with the disk shooter 2*a*.

A disk table 3 (table member) is disposed in a horizontal position in a game space below the disk lead section 2*ad* of the disk shooter 2*a* and the disk lead section 2*bd* of the disk shooter 2*b*, so as to extend in a direction away from the player.

The start checker 4 having a predetermined number of the disk shooting ports 4*t* is provided on an upright wall 1*wl* so as to become close to a deeper-side edge of the disk table 3.

A predetermined number of time lamps 5 are provided in a position above the start checker 4 so as to protrude toward the player.

The mechanical reel portion 6 which displays numbers of three digits is provided in a deep and upper position relative to the time lamps 5. The mechanical reel portion 6 is constructed such that drums (to be described later) having numbers printed thereon spin independently.

A light source (not shown) is housed in the mechanical reel portion 6. The numbers is irradiated from the inside of the slot machine 6, thereby rendering the numbers printed on the mechanical reel portion 6 noticeably visible to the player standing in front of the gaming machine 1.

The wall surface surrounding the mechanical reel portion 6 is painted in dark color, thereby constituting a dark color section 60 (i.e., a background of a virtual image display area and a dark color section of an actual substance display area).

The virtual image 7 (to be described later) to be seen by the player who stands in front of the gaming machine 1 for playing a game is provided in an upper position above the mechanical reel portion 6. The virtual image 7 is superimposed on the mechanical reel portion 6, thus constituting a display section.

A disk supplying device (not shown) having a disk payout port 8 (which is to be described later; see FIG. 5) for paying out disks 1*m* is disposed in an upper position above the virtual image 7.

A transparent plate 9 (a junction section) (to be described later; see FIG. 5) sloped toward the front is disposed in a position below the disk payout port 8 so as to cover, from above, the mechanical reel portion 6 and the time lamps 5.

A monitor 13 (image display) for supplying an original image of the virtual image 7 is housed in an upper cover section 1*o* (see FIG. 1) of the gaming machine 1 disposed in a position above the transparent plate 9 and the half mirror 1*g* (see FIG. 5).

A gaming lamp 19 is provided in a lateral and upper position relative to the disk table 3 or the mechanical slot 6.

In a front lower area of the disk table 3, a disk slide wall 1*w*2 is formed adjacent to the disk table 3 so as to make a down slope toward the front of the gaming machine such that the disk slide wall 1*w*2 becomes coplanar with the transparent plate 9. The disk slide wall 1*w*2 is formed continuous with a front internal wall of the gaming machine 1.

A pair of winning gates 10, 10 (i.e., payout disk controller) are pivotally provided on the disk slide wall 1*w*2.

A disk outlet 11 is provided in a lower front portion of the gaming machine 1. The disk outlet 11 is formed continuous with the disk slide wall 1*w*2 such that the disks 1*m* are output through the disk slide wall 1*w*2.

A disk outlet receiver 11*u* is provided in a lower portion of the front of the gaming machine 1 for receiving the disks 1*m* outputted through the disk outlet 11.

An indicator 12 is provided between the lanes 1A and 1B for indicating points acquired in a game.

The construction of individual sections of the foregoing gaming machine 1 will now be described in detail.

The disk shooter 2*a* is constituted by an shooting grip 2*ag* and a disk lead section 2*ad*. The disk shooter 2*a* is provided on the gaming machine 1 so as to pivot on the center axis of an shooting shaft member 2*aj*.

The disk shooter 2*a* is provided such that the shooting grip 2*ag* is located in a higher position, and the distal end of the disk lead section 2*ad* is located in a lower position.

The shooting grip 2*ag* is a member used by the player for manually changing the orientation of the disk 1*m* to be shot. The shooting grip 2*ag* is exposed outside the gaming machine 1 so that the player can pivot the shooting grip 2*ag* right or left while taking aim at a target.

The disk shooting slot 2*ag*1 is formed in the shooting grip 2*ag* for enabling insertion of the disks 1*m*. A player shoots the disks 1*m* one by one through the disk shooting slot 2*ag*1.

As mentioned above, the disk lead section 2*ad* is at one end thereof secured to the shooting grip 2*ag* and is at the other end thereof inserted into the game space defined by the half mirror 1*g*.

In the disk lead section 2*ad*, a guide channel for the disk 1*m* is formed to be continuous with the disk shooting slot 2*ag*1. The disk 1*m* shot through the disk shooting slot 2*ag*1 falls under its own weight and is guided through the inside of the disk lead section 2*a*, then the disk 1*m* is dropped onto the disk table 3.

An operation of the disk shooters 2*a* proceeds as follows. First, the player presses the disk 1*m* against the sidewall of the disk inset slot 2*ag*1 with his/her one hand. While retaining the disk 1*m* so as not to drop it into the disk shooter 2*a*, the player aims the shooting grip 2*ag*, by rotating it with his/her remaining hand, so that the disk 1*m* rolls into the disk passage slot 4*t* of the start checker 4.

After having aimed at the disk passages lot 4*t*, the player drops the disk 1*m*, by means of loosening the hand holding the disk 1*m* so as to cause the disk 1*m* to drop into the disk shooter 2*a* and fall onto the disk table 3. Thus, the disk 1*m* rolls toward the disk passage slot 4*t*.

The player uses either the lane 1A or lane 1B during a game and shoots the disk 1*m* into the disk passage slot 4*t* through use of the disk shooter 2*a* or 2*b* through the foregoing operation.

Figure 3A:
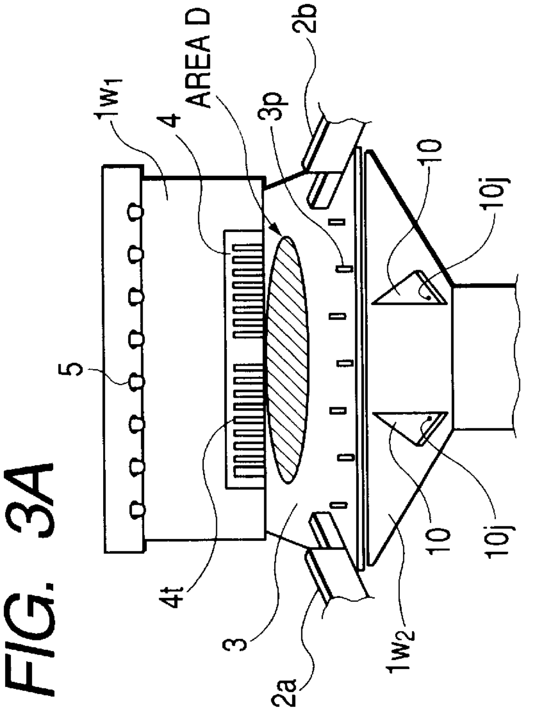
FIG. 3A is a front perspective view showing areas located in the vicinity of medal tables and a start checker, in connection with the embodiment of the slot machine according to the present invention.

As shown in FIGS. 2 and 3A, the disk table 3 is a flat table having a rectangular plane. A predetermined number of pins 3*p* are provided upright in an area of the disk table 3 close to the disk shooting slots 2*a* and 2*b*, to thereby prevent dropping of the disks 1*m* paid during a tilt mode (to be described later) at one stroke.

Figure 3B:
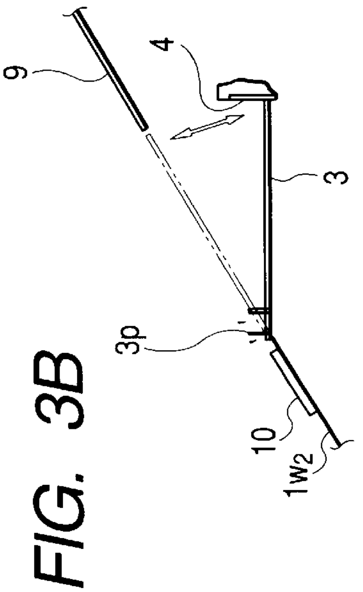
FIG. 3B is a side view showing operation of the medal table.

As shown in FIG. 3B, the disk table 3 is constructed so as to pivot about the front distal end of the table 3. The disk table 3 moves between a horizontal mode and a tilt mode. The lame 1A shown in FIG. 2 is in a horizontal mode. In contrast, as indicated by a phantom line shown in FIG. 3B, the lane 1B shown in FIG. 2 assumes a tilt mode, in which the lane 1B is tilted, about the front distal end, at substantially the same angle as that of the transparent plate 9.

When the disk table 3 is in a horizontal mode, the player can shoot the disk 1*m* into the disk shooter 2*a* or 2*b* toward the disk passage slot 4*t* of the start checker 4.

When the gaming machine 1 shifts to a mode for paying out the disk 1*m*, the disk table 3 enters a tilt mode. The disk 1*m* paid through the disk payout port 8 slides over the transparent plate 9, successively sides over the sloped disk table 3, and passes through pins 3*p*, 3*p*, . . . which are obstacles, thereby falling onto the disk slide wall 1*w*2.

The disk table 3 may shift to a tilt mode in a case other than the disk payout mode, as required. The disk 1*m*, to be placed in section D shown in FIG. 3A, which has failed to enter the disk passage slot 4*t* falls onto the disk slide wall 1*w*2 under its own weight.

Figure 3C:
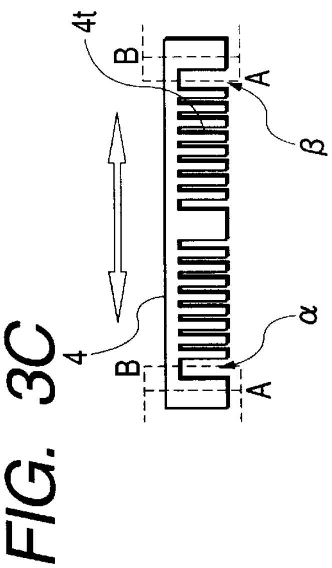
FIG. 3C is a front view showing operation of the start checker.

As shown in FIG. 3C, the start checker 4 has the predetermined number of disk passage slots 4*t*. The disk passage slots 4*t* provided on opposite sides are formed so as to become greater in opening area than the disk passage slots 4*t* located in the center.

The start checker 4 moves back and forth horizontally. The back-and-forth movement of the start checker 4 is realized by means of converting a rotating motion of a motor by means of a cam or link.

When the start checker 4 has moved to the rightmost end, the disk passage slot 4*t* which has a wider opening and is located at the left-most end and designated by α is exposed to the player. In contrast, when the start checker 4 has moved to the leftmost end, the disk passage slot 4*t* which is designated by β is located at the rightmost end, and has a wider opening.

In the present embodiment, the start checker 4 is constituted by a single member. However, the disk passage slots 4*t* may be constituted by means of relative motion of a plurality of members.

Rotational movement may be employed as movement of the start checker 4, as required.

An optical sensor 22 (serving as a passage sensor; see FIG. 11) is provided behind of the start checker 4 for sensing that the disk 1*m* has passed through the disk slot 4*t*.

The optical sensor 22 has a light-emitting section (light-emitting diode) and a light-receiving section (phototransistor). The disk 1*m* that has passed through the disk passage slot 4*t* interrupts the light emitted from the light-emitting section. The optical sensor 22 senses that the disk 1*m* has passed through the disk passage slot 4*t*, from a failure of the light-receiving section to detect light.

A predetermined number of time lamps 5 are provided horizontally. The time lamps 5 inform the player that the disk table 3 is to shift to a tilt mode, or that the disk 1*m* shot by the player while the mechanical reel portion 6 is spinning has passed through the disk passage slot 4*t* of the start checker 4.

That is, at the beginning of a game, all the time lamps 5 remain illuminated. With lapse of time, the time lamps 5 go off one after another. When all the time lamps 5 have gone off, the disk table 3 shifts to a tilt mode, thereby dropping the disks 1*m* located on the disk table 3 onto the slide wall 1*w*2.

As mentioned above, the blinking action of the time lamps 5, and the tilt mode of the table in which the disks located on the disk table 3 a returned to the player and the horizontal mode in which the player can shoot a disk 1*m* to the disk passage slot 4*t* are associated each other. Therefore, playing action rhythm of the gaming machine 1 can be imparted to the player, thus informing the player of a timing at which the player can plays games with agility.

When all the time lamps 5 have gone off in the above example, the disk table 3 shifts from a horizontal mode to a tilt mode. Conversely, at the beginning of a game, all the time lamps 5 may remain extinguished, and the time lamps 5 may be illuminated one after another. When all the time lamps 5 have illuminated, the disk table 3 may shift to a tilt mode.

Alternatively, there may also be employed a method of shifting the disk table 3 from a horizontal mode to a tilt mode when a predetermined number of time lamps 5 have illuminated or extinguished. Various methods may be adopted as methods of illuminating or extinguishing the time lamps 5 in association with the mode of the disk table 3.

A function of the time lamps 5 other than the function associated with the mode of the disk table 3 is to cause one of the time lamps 5 to blink when the disk 1*m* shot by the player has passed through the disk passage slot 4*t* of the start checker 4 during the spinning action of the mechanical reel portion 6.

The pair of winning gates 10, 10 are plastic molded articles. The winning gates 10, 10 are formed into flat triangular plates of predetermined thickness. The winning gates 10, 10 are arranged on the disk slide wall 1*w*2 in a symmetrical layout.

Figure 3D:
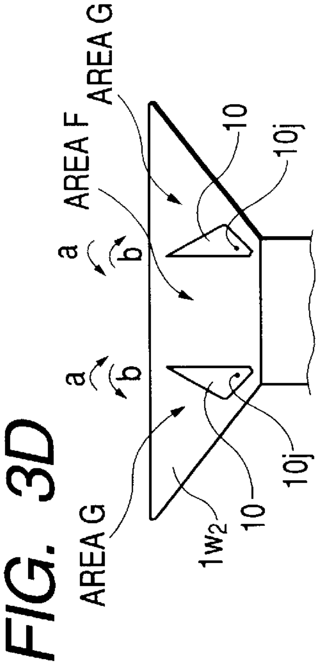
FIG. 3D is a front view showing a closed state of winning gates.
Figure 3E:
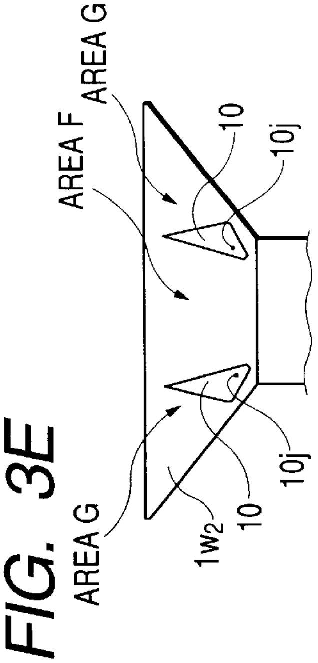
FIG. 3E is a front view showing an open state of the winning gates.

As shown in FIGS. 3A, 3D, and 3E, the winning gates 10, 10 are provided on the disk side wall 1*w*2 so as to be able to pivot on respective shafts 10*j*. Only a disk which slidably travels through a space between the winning gates 10, 10, designated by F shown in FIGS. 3D and 3E, on the disk slide wall 1*w*2 is stored into the disk outlet receiver 11*u* through the disk outlet port 11. Thus, the player acquires disks 1*m*.

The disk 1*m* which slides through a passage G (non-return passage) other than the space between the winning gates 10, 10 shown in FIGS. 3D and 3E is not acquired by the player and is recovered (see FIG. 4).

The winning gates 10, 10 have the following three modes.

Figure 4A:
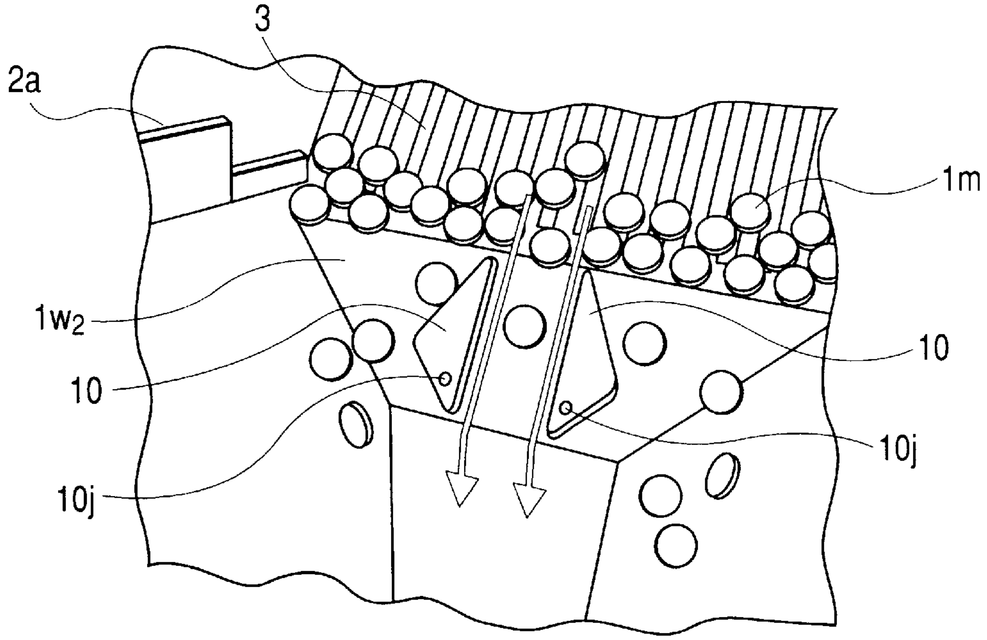
FIG. 4A is a perspective view showing sliding of a medal in a closed state of the winning gates, in connection with the embodiment of the slot machine according to the present invention.

As shown in FIGS. 3D and 4A, in a first mode, the winning gates 10, 10 are closed in the direction designated by arrow "a". The first mode is a normal tulip mode, in which there is a low probability of the sliding disk 1*m* successfully passing through the space between the winning gates 10, 10.

Figure 4B:
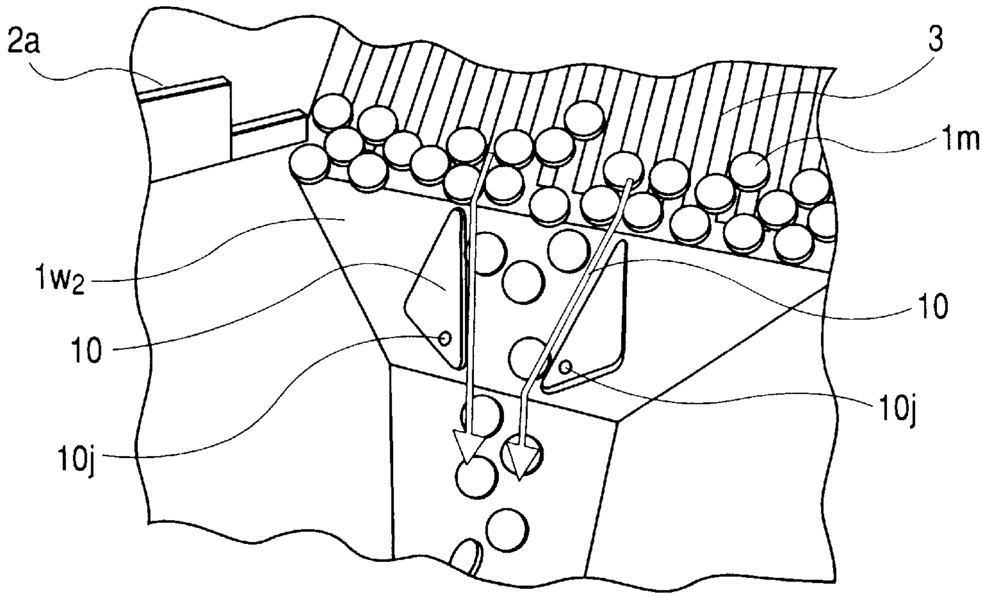
FIG. 4B is a perspective view showing sliding of medals in an open state of the winning gates.

In a second mode, the winning gates 10, 10 are opened in the direction designated by arrow "b". As shown in FIGS. 3E and 4B, the second mode is a big tulip mode, in which there is a high probability of a sliding disk 1*m* successfully passing through the space between the winning gates 10, 10.

As shown in FIG. 3D, a third mode is a regular tulip mode, in which the winning gates 10, 10 are alternately closed in the direction designated by arrow "a" and opened in the direction designated by arrow "b." The probability of the disk 1*m* successfully passing through the space between the winning gates 10, 10 is higher than that in the normal tulip mode and lower than that in the big tulip mode.

The winning gates 10, 10 usually effect a game in the normal tulip mode. After the disk 1*m* has passed by a check point (to be described later), the winning gates 10, 10 enter the regular tulip mode. After a jackpot (to be described later) has hit, the winning gates 10, 10 enter the big tulip mode.

The opening and closing action of the winning gates 10, 10 can be susceptible to various operation modes other than those mentioned above. For example, the degree of opening of the winning gates 10, 10 is changed in accordance with progress in a game.

As shown in FIG. 3, the construction of the winning gates 10, 10 and the construction of the start checker 4 which travels back and forth combine to provide the following challenges to the player. Namely, there is provided a low probability of a shot disk successfully passing through one of the disk passage slots 4*t* which are located in the area F between the winning games 10, 10 and have a small opening area, thereby providing a disk to the player. In contrast, there is provided a high probability of a shot disk passing through the disk passage slots 4*t* located in the areas G located outside the area F, thereby failing to provide a disk to the player.

When the player shoots a disk while aiming at the disk passage slot 4*t* provided at either end, there is a high probability of a shot disk passing through the disk passage channel 4*t*. If the disk has failed to pass through the disk passage slot 4*t*, the disk slides over either of the areas G other than the area F when the disk table 3 is in the tilt mode. Therefore, the player cannot regain the shot disk.

On the other hand, when the player shoots a disk while aiming at any of the disk passage slots 4*t* located in the center, there is a low probability of passing through the disk passage slot 4*t*. However, if the disk has failed to pass through the disk passage slot 4*t*, there is a high probability of the disk sliding over the area F located between the winning gates in the tilt mode. Therefore, there is a high chance of the player being able to regain the shot disk.

The construction of the mechanical reel portion 6 and that of the virtual image 7 will now be described.

Figure 5A:
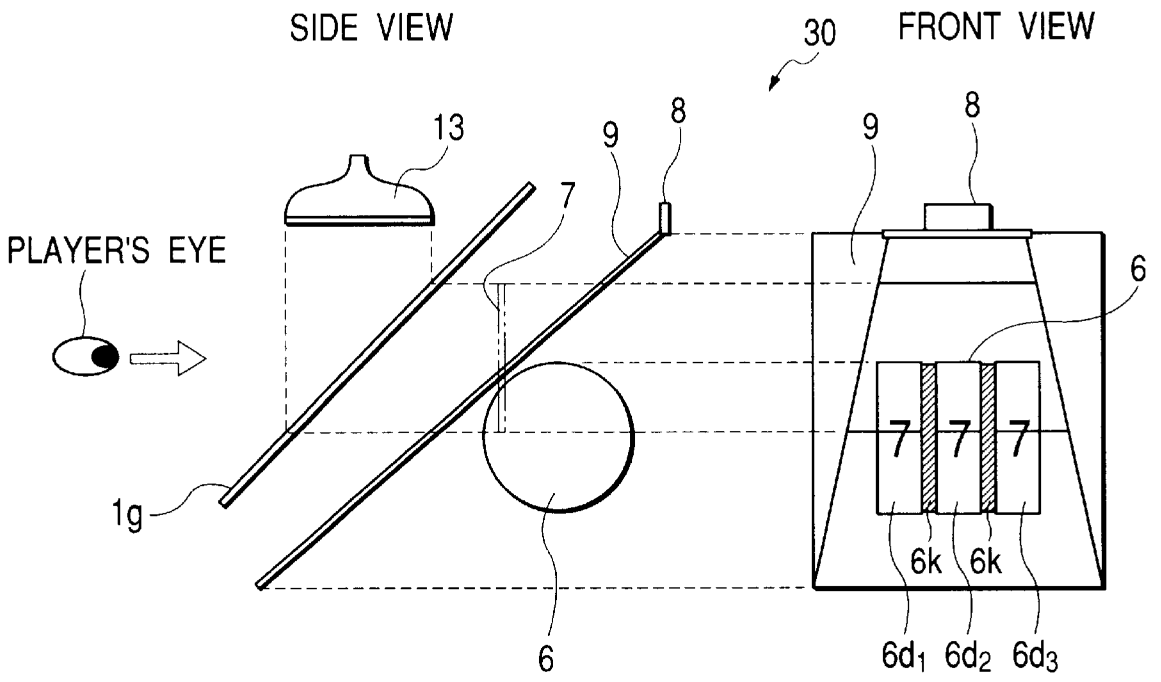
FIG. 5A is a diagram showing the principle of an embodiment of a virtual image/actual substance superimposing and displaying apparatus according to the present invention.

As can be seen from FIG. 5A, which shows the virtual image/real image superimposing and displaying apparatus 30, the mechanical reel portion 6 is a cylindrical steel wheel.

Cylindrical spinning wheels 6*d*1, 6*d*2, and 6*d*3 which are identical in size with the mechanical reel portion 6 are provided side by side around the mechanical reel portion 6 in the thickness wise direction. Numbers from 0 through 9 are printed on a circumferential surface of each of the spinning wheels 6*d*1, 6*d*2, and 6*d*3.

Arbitrary material, such as plastic, can be selected as material of the mechanical reel portion 6.

The spinning wheels 6*d*1, 6*d*2, and 6*d*3 are constituted so as to rotate about the center axis of the mechanical reel portion 6 independently of each other. A dark color section 6*k* (a dark color section of an actual substance display area) is provided between the wheels 6*d*1, 6*d*2, and 6*d*3.

An image appearing on the monitor 13 oriented downward is refracted 90° by means of the half mirror 1*g* disposed at an inclination of 45°. The thus-diffract image advances toward the mechanical reel portion 6, thereby forming the virtual image 7 in the vertical direction.

As shown in FIG. 5, the virtual image 7 crosses the transparent plate 9 and the mechanical reel portion 6 at a right angle.

Figure 5B:
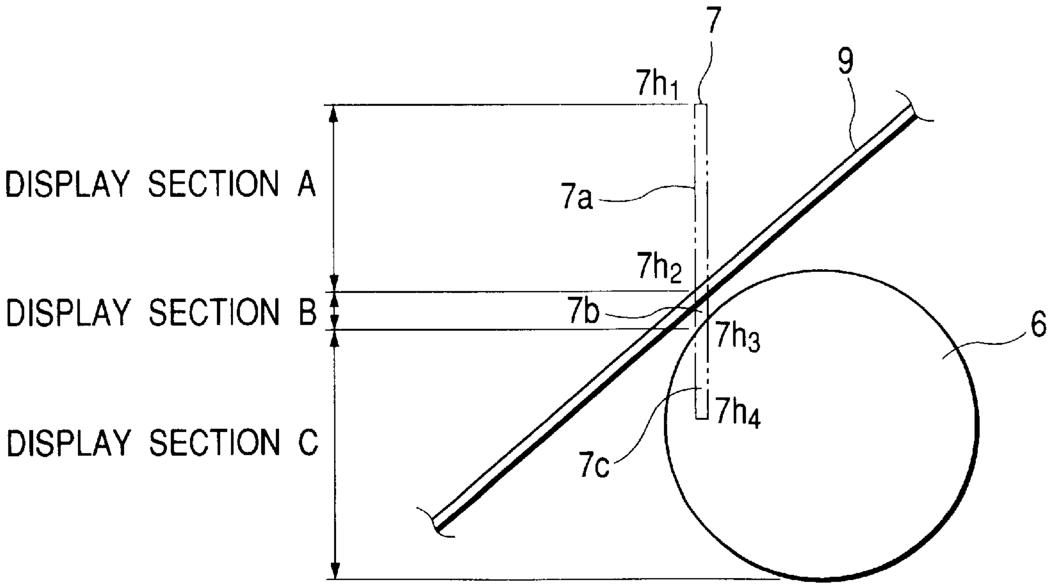
FIG. 5B is an enlarged side view showing a positional relationship between a virtual image and an actual substance.

As shown in FIG. 5B, the virtual image 7 comprises a virtual image 7*a*, a virtual image 7*b*, and a virtual image 7*c*. The virtual image 7*a* extends from an upper end 7*h*1 to an intersection 7*h*2 between the virtual image 7 and the transparent plate 9 in the downward direction. The virtual image 7*b* extends from the intersection 7*h*2 to an intersection 7*h*3 between the circumferential surface of the mechanical reel portion 6 and the virtual image 7 in the downward direction. The virtual image 7*c* extends from the intersection 7*h*3 to a lower end 7*h*4 formed in the mechanical slot 6 in the downward direction.

In a display section A (i.e., a virtual image display area) shown in FIG. 5B, the virtual image 7*a* is formed in a position forward from the transparent plate 9 and the circumferential surface of the mechanical reel portion 6. The player who plays a game in front of the gaming machine 1 views the virtual image 7*a* in the most forward position, and the transparent plate 9 is viewed as if it were positioned behind the virtual image 7*a*. Further, the circumferential surface of the mechanical reel portion 6 is viewed as if it were located behind the transparent plate 9.

In the display section B (i.e., a virtual display area), the transparent plate 9, the virtual image 7*b* and the circumferential surface of the mechanical reel portion 6 are situated in the sequence given from the position most close to a player. Hence, a player who plays a game in front of the gaming machine 1 views the transparent plate 9 in the closest position. The virtual image 7*b* is viewed as if it follows the transparent plate 9, and the circumferential surface of the mechanical reel portion 6 is situated so as to follow the virtual image 7*b*.

In a display section C, the transparent plate 9, the circumferential surface of the mechanical reel portion 6 and the virtual image 7*c* are located in the sequence given from the position most close to the player. Hence, a player who plays a game in front of the gaming machine 1 views the transparent plate 9 in the position most close to the player. The circumferential surface of the mechanical reel portion 6 is viewed as if it follows the transparent plate 9, and the virtual image 7*c* is viewed as if it ware located within the mechanical reel portion 6.

Figure 6:
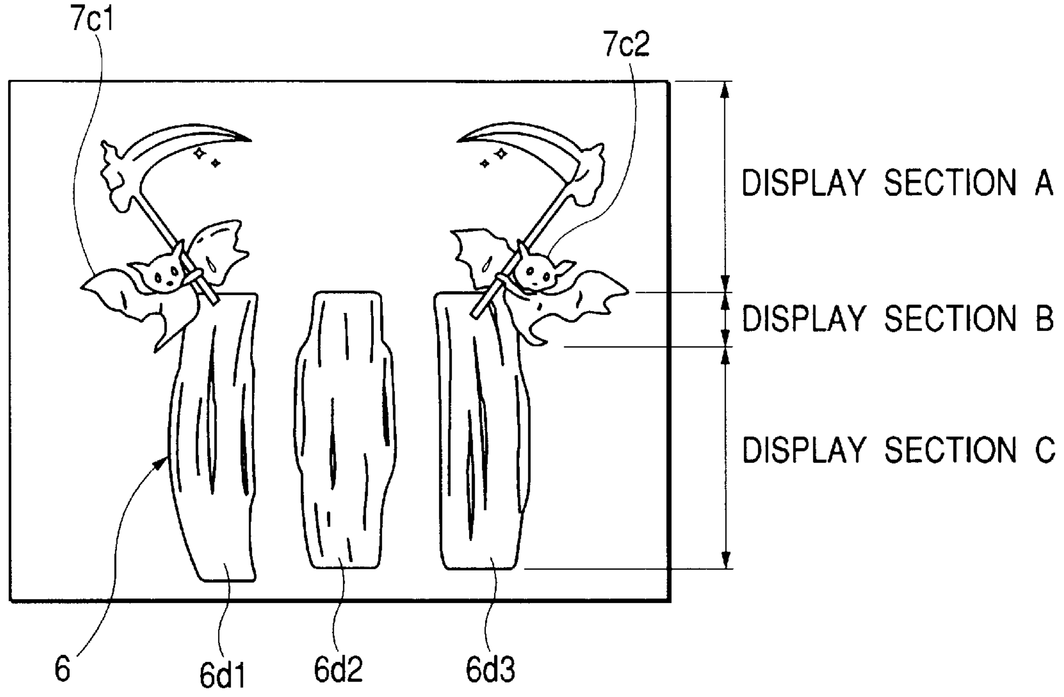
FIG. 6 is a front view showing a virtual image and a mechanical reel portion of the embodiment of the virtual image/real image superimposing and displaying apparatus according to the present invention.

For example, FIG. 6 shows a display section, in which virtual-image characters 7*c*1 and 7*c*2 are superimposed on the spinning mechanical reel portion 6.

The characters 7*c*1 and 7*c*2 are displayed on the display sections A and B, and the spinning mechanical reel portion 6 is provided in the display sections B and C.

The player who plays a game in front of the gaming machine 1 views the characters 7*c*1 and 7*c*2, which are virtual images, in the display sections A and B, as if the characters 7*c*1 and 7*c*2 were located in the position most close to the player. Subsequently, the circumferential surface of the spinning mechanical reel portion 6 is situated as if it were located behind the characters 7*c*1 and 7*c*2.

Figure 7:
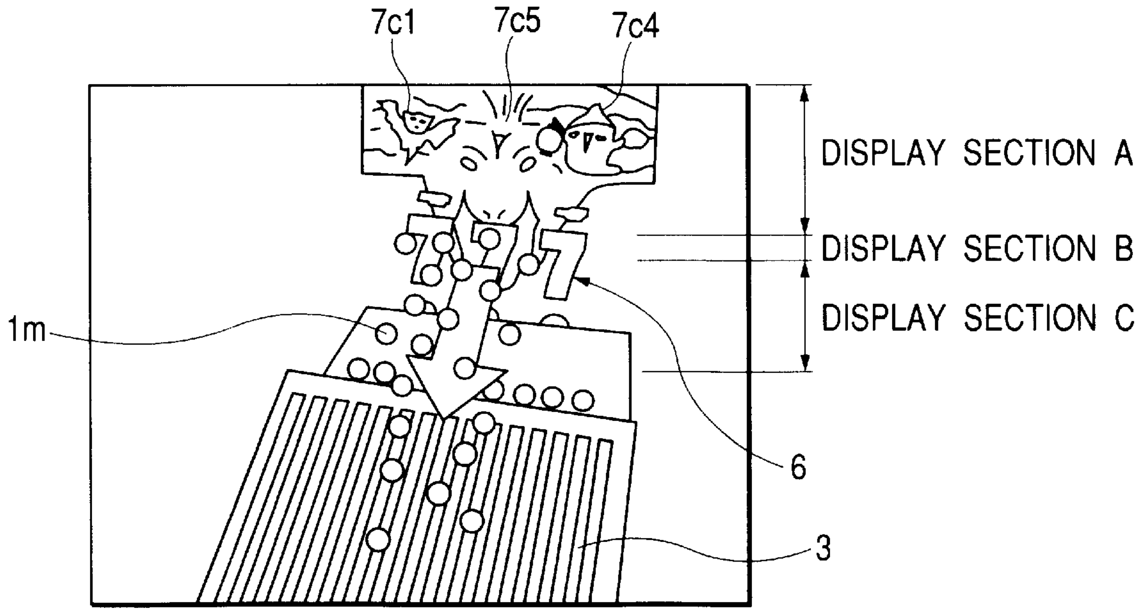
FIG. 7 is a perspective view showing the principal feature of the embodiment of the virtual image/real image superimposing and displaying apparatus according to the present invention, showing payout of medals.

For example, FIG. 7 shows that characters 7*c*1 and 7*c*4 are displayed in the display section A and that a lion character 7*c*5 having an open mouth is displayed in the display sections A and B.

The drawing shows that the mechanical slot 6 has hit and that the disks 1*m* are paid out from the disk payout port 8.

Here, the mouth of the lion character 7*c*5 is situated so as to include the intersection 7*h*2 shown in FIG. 5B between the virtual image and the transparent plate 9; that is, the boundary (7*h*2) between the display sections A and B. The disk 1*m* paid through the disk payout port 8 slides over the transparent plate 9 and runs forward of the virtual image 7*b* across the intersection 7*h*2 from the back side of the virtual image 7*a*.

The player who plays a game in front of the gaming machine 1 visually ascertains the character 7*c*1, the character 7*c*4, and the lion character 7*c*5 in an upper portion of the display section. Particularly, the player views as if the mouth of the lion character 7*c*5 includes the boundary (7*h*2) between the display sections B and C. Hence, the disk 1*m* is viewed as if it were vomited from the mouth of the lion character 7*c*5 and were sliding over the numbers printed on the circumferential surface of the mechanical reel portion 6 (i.e., the display sections B and C).

Figure 8A:
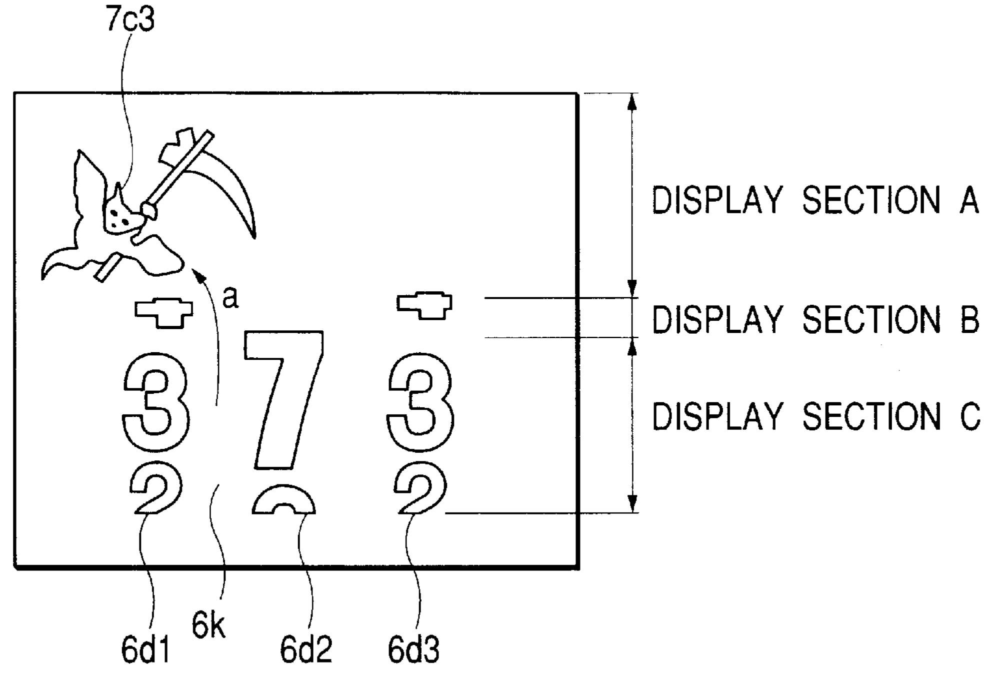
FIGS. 8A and 8B are front views showing a transient region in display between a virtual image and a mechanical reel portion relating to the embodiment of the virtual image/real image superimposing and displaying apparatus according to the present invention.

FIG. 8A shows that, when the mechanical reel portion 6 has stopped spinning, the character 7*c*3 (i.e., a virtual video image moving between the actual substance display area and the virtual image display area, or a virtual image appearing in a dark color section of the actual substance display area) appears in the dark color section 6*k* located between the spinning wheels 6*d*1 and 6*d*2 of the display section C. FIG. 8A shows that the character 7*c*3 has moved-from the display section C to the display section A via the display section B, as indicated by arrow "a".

As shown in FIG. 5B, the virtual image 7*c* is located within the mechanical reel portion 6 in the display section C. In the display section B, the virtual image 7*b* is situated front of the circumferential surface of the mechanical reel portion 6 situated between the circumferential surface of the mechanical reel portion 6 and the transparent plate 9. In the display section A, the virtual image 7*a* is situated front of the circumferential surface of the mechanical slot 6 and the transparent plate 9.

Accordingly, the character 7*c*3 appears in the dark color section 6*k* located between the wheels 6*d*1 and 6*d*2 of the display section C. When the character 7*c*3 has moved from the display section C to the display section A through the display section B as indicated by arrow "a", the player who plays a game in front of the gaming machine 1 views the character 7*c*3 as if it appeared from the inside of the mechanical reel portion 6 and moved to a position for ward of the mechanical reel portion 6.

Figure 8B:
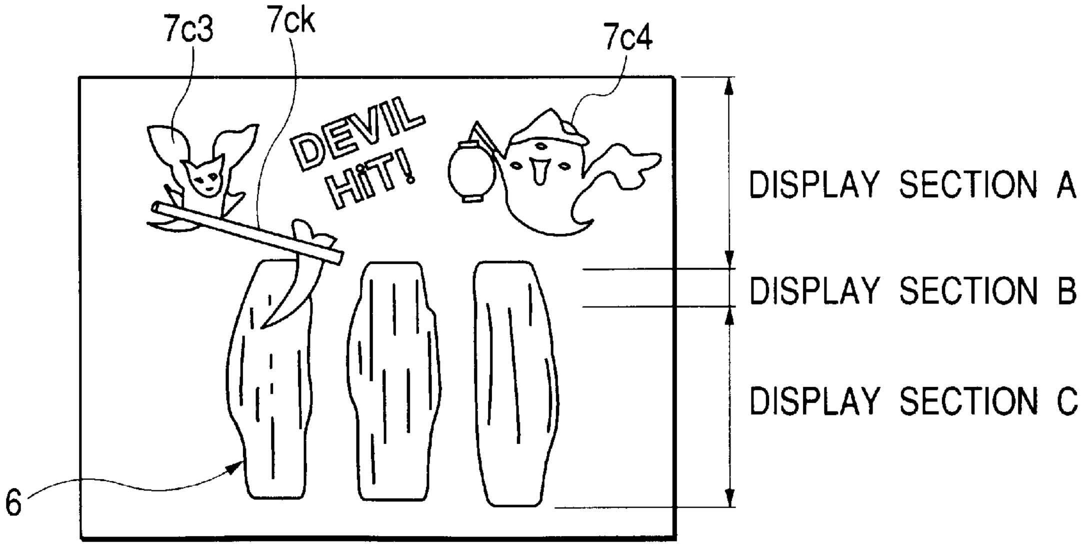

FIG. 8B shows that another character 7*c*4 appears in the display section 4 while the character 7*c*3 still remains in the display section as shown in FIG. 8A. A set of characters "DEVIL HIT!" is displayed on the display section.

The display section shows that the spinning wheels 6*d*1, 6*d*2, and 6*d*3 of the mechanical reel portion 6 start spinning simultaneously when a hammer 7*ck* held by the character 7*c*3 is swung down.

The motion of the hammer 7*ck* held by the character 7*c*3 of virtual image is synchronized with the motion of the mechanical reel portion 6 of actual substance. As a result, the player can view the virtual-image character as if it affects the motion of an actual substance.

For instance, a character of virtual image appears in the display section A located above the stationary mechanical reel portion 6. In synchronism with the character being displayed so as to manually raise the mechanical reel portion 6 upward, the mechanical reel portion 6 starts spinning. The player views the mechanical reel portion 6 as if the character manually spun the mechanical reel portion 6.

Figure 9:
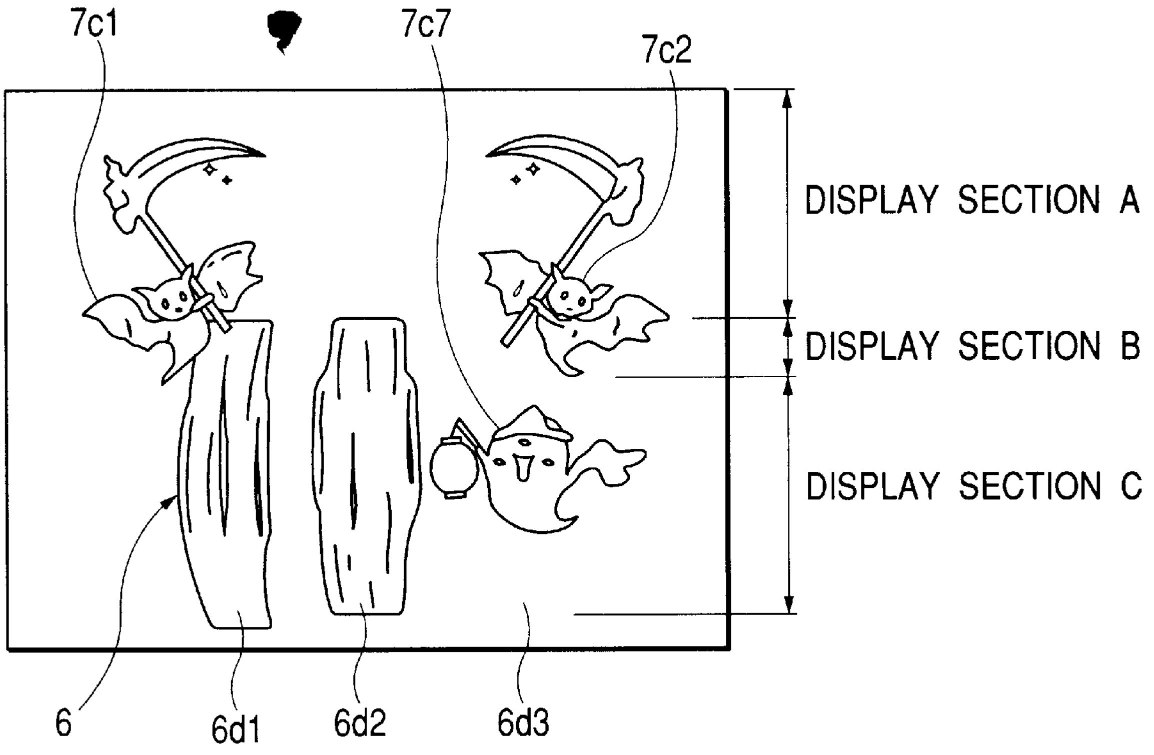
FIG. 9 is a front view showing a display example of a virtual image and that of a mechanical reel portion relating to the embodiment of the virtual image/real image superimposing and displaying apparatus according to the present invention.

FIG. 9 shows an example in which the light source provided in the mechanical reel portion 6 is controlled when a winning combination, such as 333 or 555, has hit, thereby changing the number on the drum 6*d*3 dark. Further, a character 7*c*7 of virtual image is displayed on the drum 6*d*3 of the display section C, and the spinning drums 6*d*1 and 6*d*2 of the mechanical reel portion 6 are spun.

In this construction, when the spinning drums 6*d*1 and 6*d*2 of the mechanical reel portion show the same number, the player can achieve slot winning. As a result, the probability of achieving slot winning is increased.

Here, FIG. 9 shows an example in which the light source provided in the mechanical reel portion 6 is controlled to thereby change one of the spinning drums 6*d*1, 6*d*2, and 6*d*3 of the mechanical reel portion 6 to a dark color and display a virtual image. However, any two of the spinning drums may be changed to a dark color, thereby displaying a virtual image in the display section C on the drums.

In this case, the spinning mechanical slot 6 has stopped, and ordinal ranks, e.g., 7, 3, 5, . . . , maybe assigned to numbers printed on a single drum which is not hidden by the virtual image. A game point is provided to the player in accordance with a number indicated by the drum.

A display device 12 is a display device which displays a four-digit number or character produced by use of a fluorescent display tube of 16 segments capable of displaying characters. The display device 12 shows points in a game.

When the disk 1*m* shot by the player has passed through the disk passage slot 4*t* of the start checker 4 and the mechanical reel portion 6 has hit through spinning, the game lamps 19 are illuminated one after another in sequence from a lower lamp.

As shown in FIG. 10A, the game lamps 19 are illuminated one after another from a lower game lamp 19 every time one slot has hit, in accordance with an arrow. The number of disks 1*m* paid out from the disk payout port 8 of the disk supply device when the game lamps 19 have been illuminated is as illustrated.

As shown in FIG. 10B, the game lamps 19 maybe constructed by means of adding one step between steps 6 and step 9 shown 6 in FIG. 10A or by means of adding two steps between step 9 and step 12.

Steps can be set as required.

A controller according to the present embodiment will next be described.

Figure 11:
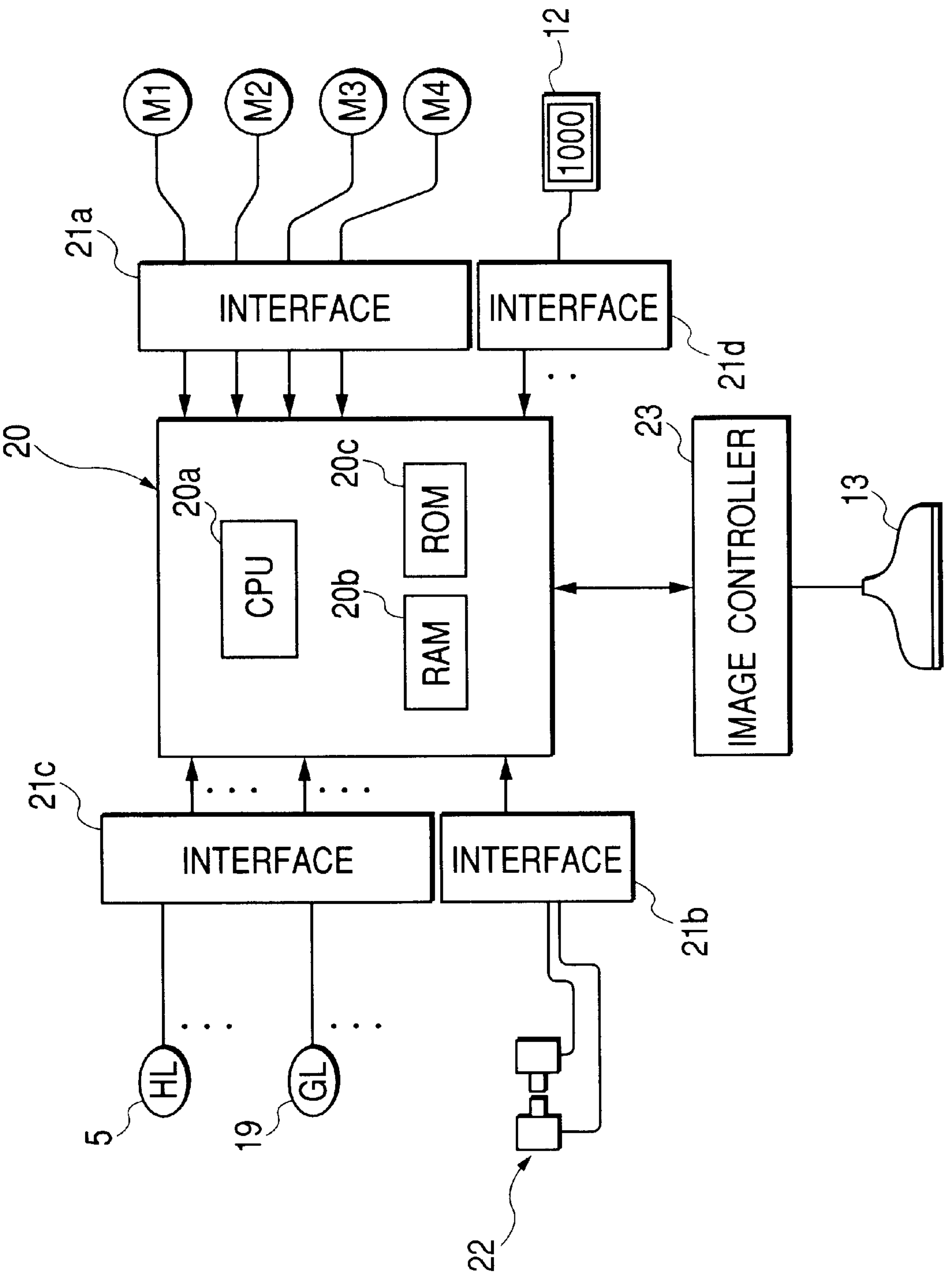
FIG. 11 is a diagram showing the construction of controller relating to an embodiment of the slot machine according to the present invention.

As shown in FIG. 11, a controller 20 for controlling the gaming machine 1 comprises a CPU (central processing unit) 20*a* serving as a center of control; random access memory (RAM) 20*b* for storing data; and read only memory (ROM) 20*c* having a control program written therein beforehand.

A processing operations to be performed by the gaming machine 1 is performed by executing a control program stored in the ROM 20*c*. The control program is described through use of an assembler language or a C language.

The controller 20 is connected, via an interface 21*a*, to a motor M1 for actuating the disk table 3, a motor M2 for actuating the start checker 4, a motor M3 for actuating the winning gates 10, 10, and a motor M4 for driving the mechanical reel portion 6. Here, the interface 21*a* is a motor drive circuit.

The controller 20 is connected to an optical sensor 22 via an interface 21*b*, as well as to the time lamps 5 and the game lamps 19 via an interface 21*c*. Here, the interface 21*b* is a sensor circuit, and the interface 21*c* is a relay drive circuit.

The controller 20 is connected to the display device 12 via an interface 21*d* serving as a display device control circuit.

The controller 20 is connected to an image controller 23 (i.e., image controller) for controlling contents to be displayed on the monitor 13.

The image controller 23 has ROM having stored therein an image control program, the program describing video contents to be displayed on the monitor 13, and RAM for storing data. As a result of execution of the image control program, an image appears on the monitor 13.

A virtual image of an image to be displayed on the monitor 13 is synchronized with the motion of a mechanical member, such as the mechanical reel portion 6 controlled by the controller 20, in the manner mentioned above, by means of bringing the image control program in synch with the control program.

The outline of a game to be performed by the gaming machine 1 will now be described.

A game to be performed by the gaming machine 1 has twelve steps.

A current step of the twelve steps in a game is indicated by the game lamps 19 shown in FIG. 2. The game lamps 19 are arranged from the bottom in a sequence corresponding to the sequence of the steps.

More specifically, the correspondence between the steps and the respective game lamps 19 is shown in FIG. 10A.

For instance, the game lamp 19 located in the bottom of a column shown in FIG. 2 denotes step 1. A third game lamp 19 from the bottom denotes step 3. A game lamp 19 located the top denotes step 12.

Here, step 3, step 6, step 9, and step 12 correspond to check points. The steps are set such that disks 1*m* paid in one step are larger in number than in another step. The number of disks 1*m* to be paid becomes greater with an increase in the number of steps.

More specifically, 25 disks 1*m* are paid in step 3; 50 disks 1*m* are paid in step 6; 75 disks 1*m* are paid in step 9; and 125 disks 1*m* are paid in step 12.

In each of the remaining steps, that is, step 1, step 2, step 4, step 5, step 7, step 8, step 10, and step 11, 10 disks 1*m* are paid.

At the time of a game, the player shoots a disk 1*m* into the disk shooter 2*a* while taking aim at the disk passage slot 4*t* of the start checker 4.

As the thus-shot disk 1*m* passes through the disk passage slot 4*t*, the spinning wheels of the mechanical reel portion 6 start spinning. If numbers on the drums constitute a triple number; e.g., 333, 888, or 999 (kinds of slot winning combinations) when the wheels are automatically stopped, slot winning hits.

When slot winning has hit, the player proceeds to the next step. The disks 1*m,* in number corresponding to the step, are paid through the disk payout port 8 of the disk supplying apparatus, and the player acquires one game point.

The game point total is displayed on the display device 12, and one point is added to the game point total as a result of slot winning. The thus-added game point total is displayed.

When processing has proceeded to step 12, the game is started again from step 1.

For example, when the game lamps 19 from the bottom lamp to the third lamp are illuminated and then slot winning has hit, the fourth game lamp 19 from the bottom is illuminated, and processing proceeds to step 4. Then, ten disks 1*m* are paid, and one point is added to the game point total.

As another example, when the game lamps 19 from the bottom lamp to the fifth lamp are illuminated and then slot winning has hit, the sixth game lamp 19 from the bottom is illuminated, and processing proceeds to step 6. Then, fifty disks 1*m* are paid, and one point is added to the game point total.

As another example, when all the game lamps 19 remain extinguished and slot winning has hit, only the bottom game lamp 19 is illuminated, and processing proceeds to step 1. Ten disks 1*m* are paid out, and one point is added to the game point total.

When the triple number 777 from among slot winning combinations is constituted, the number is set to a jackpot winning. Disks 1*m* equal in number to the game points appearing on the display device 12 are paid through the disk payout port 8.

An initial value of game point total is set to 200 or 300. After a jackpot winning has hit, the game point total is started again from an initial value.

The initial value of game point total is not limited to the number set forth and may be set arbitrarily.

Figure 12:
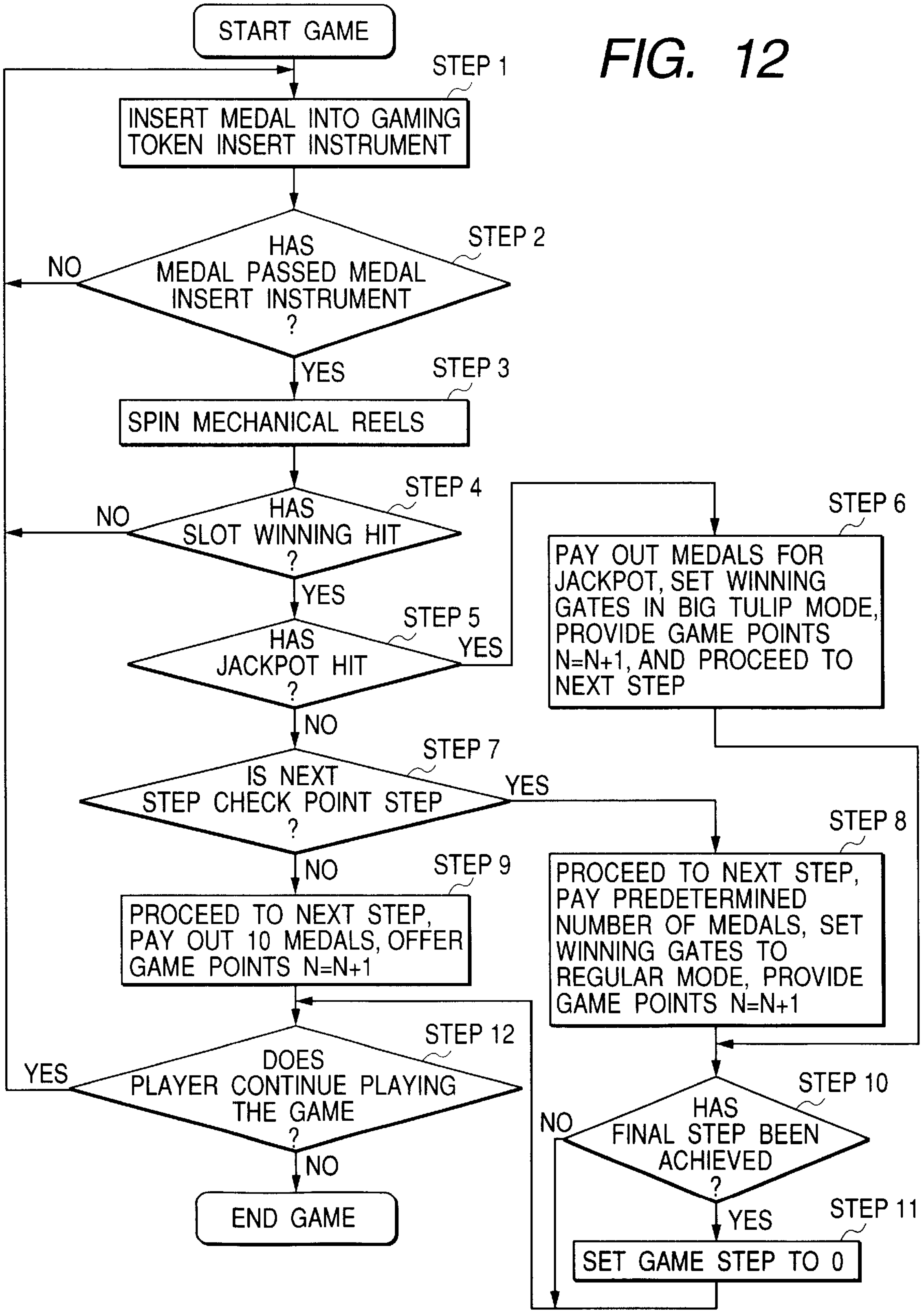
FIG. 12 is a flowchart showing flow of processing of a game relating to an embodiment of the slot machine according to the present embodiment.

Next, progress in game will now be described by reference to FIG. 12.

(Step 1)

Figure 13A:
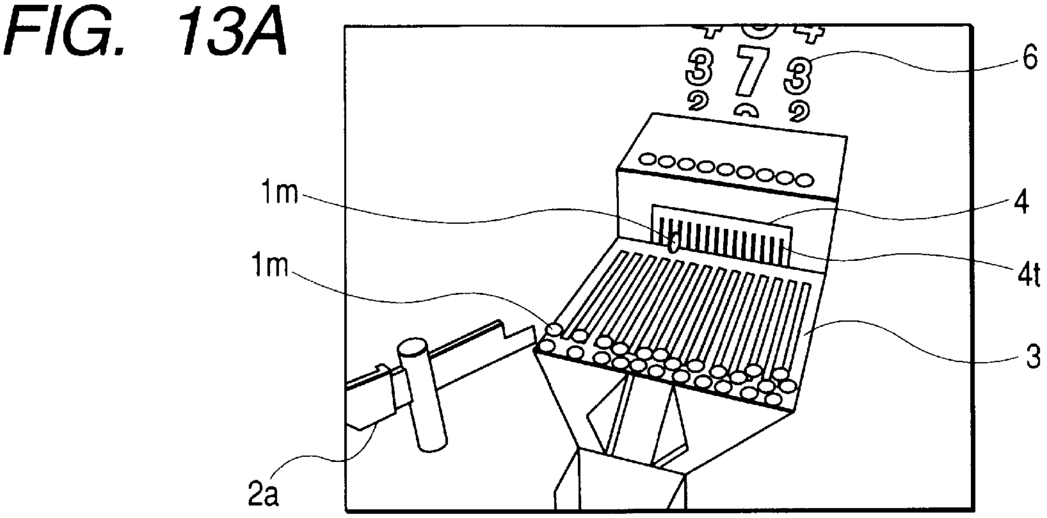
FIGS. 13A through 13C are perspective views showing the principal feature of the embodiment of the slot gaming apparatus according to the present invention, showing a transition in game.

As shown in FIG. 13A, the player actuates the disk shooter 2*a* and shoots a disk 1*m* into the disk shooter 2*a*, taking aim so as to attempt to make the disk 1*m* enter the disk passage slot 4*t* of the start checker 4.

(Step 2)

A determination is made as to whether the thus-shot disk 1*m* has hit and passed through the disk passage slot 4*t*.

If not, processing returns to (step 1).

(Step 3)

Figure 13B:
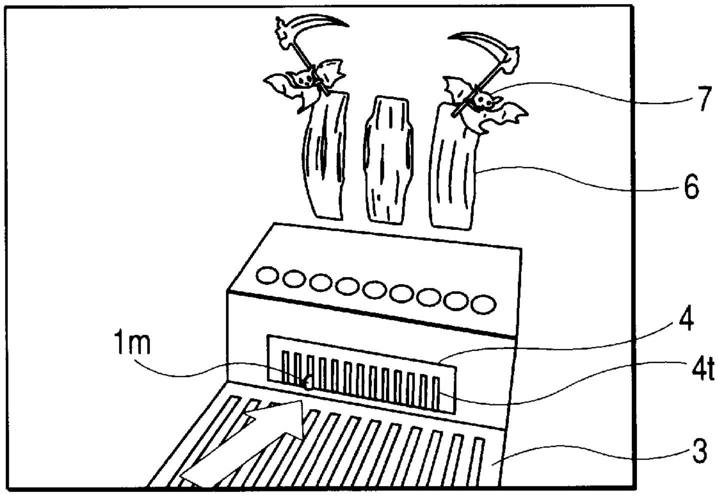

As shown FIG. 13B, the disk 1*m* passes through the disk passage slot 4*t*. When the optical sensor 22 detects passage of the disk 1*m*, the drums 6*d*1, 6*d*2, and 6*d*3 of the mechanical reel portion 6 start spinning independently.

(Step 4)

The drums 6*d*1, 6*d*2, and 6*d*3 of the mechanical reel portion 6 automatically stop spinning. A determination is made as to whether the numbers printed on the drums 6*d*1, 6*d*2, and 6*d*3 constitute a triple number for slot winning.

If not, processing returns to (step 1).

(Step 5)

A determination is made as to whether the numbers printed on the drums 6*d*1, 6*d*2, and 6*d*3 of the mechanical reel portion 6 constitute a triple number "777" for jackpot winning.

(Step 6)

When jackpot winning has hit, the disk table 3 shifts to a tilt mode (see FIG. 3B), and the winning gates 10, 10 enter a big tulip mode (see FIG. 3E).

Disks 1*m* equal in number to the game point total appearing on the display device 12 are paid through the disk payout port 8 of the disk supply apparatus.

Figure 13C:
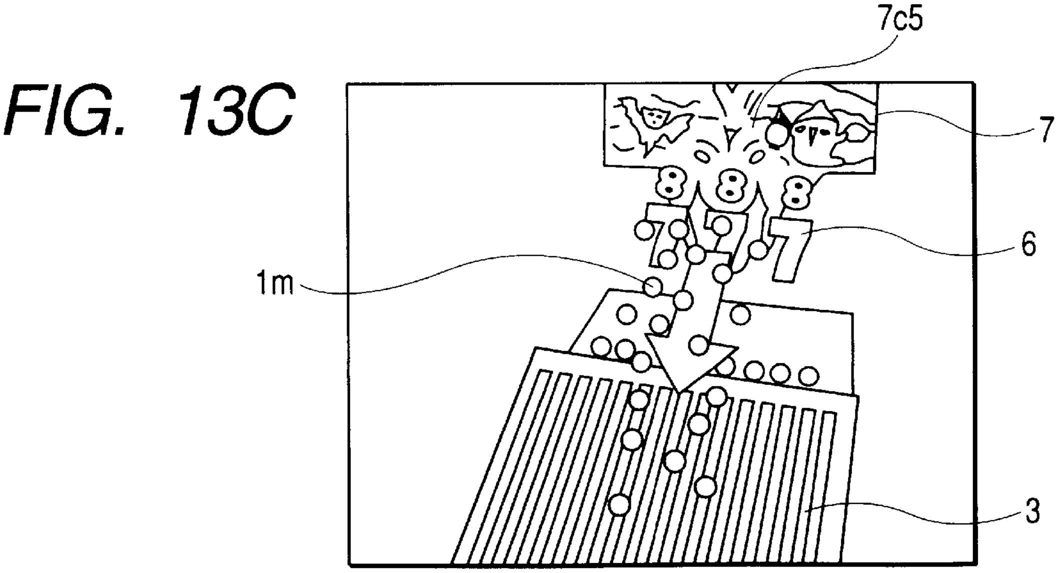

As shown in FIG. 13C, the thus-paid disks 1*m* slide over the transparent plate 9 and drop so as appear to be spit out from the mouth of the lion character 7*c*5. Further, the disks 1*m* slide over the disk table 3 and then over the disk slide wall 1*w*2.

As shown in FIG. 4B, of the disks 1*m* which slide over the disk slide wall 1*w*2, any disks 1*m* which pass through the space between the winning gates 10, 10 indicated by arrow are paid to the disk outlet receiver 11*u* through the disk outlet port 11. Thus, the player acquires the disks 1*m*.

Simultaneously, the gaming machine 1 proceeds to the next step. The game lamp 19 of the next step is illuminated, and an initial value of game point total appears on the display device 12.

(Step 7)

A determination is made as to whether the next step to which processing is to proceed as a result of slot winning corresponds to a check point step (any one of steps 3, 6, 9, and 12).

(Step 8)

If the next step, to which processing is to proceed as a result of occurrence of a slot winning, corresponds to a check point step, processing proceeds to the next check point step, and the game lamp 19 of the step is illuminated.

The disk table 3 shifts to a tilt mode (see FIG. 3B), and the winning gates 10, 10 enter a regular tulip mode, in which the gates are alternately closed in the direction designated by arrow "a" and opened in the direction designated by arrow "b."

The disks 1*m* equal in number to the step to which processing has proceeded (see FIG. 10A) are paid through the disk payout port 8 of the disk supply apparatus.

As shown in FIG. 13C, the thus-paid disks 1*m* slide over the transparent plate 9 and drop so as to be spit out from the mouth of the lion character 7*c*5. Further, the disks 1*m* slide over the disk table 3 and then over the disk slide wall 1*w*2.

As shown in FIG. 4, of the disks 1*m* which slide over the disk slide wall 1*w*2, any disks which pass through the space between the winning gates 10, 10 indicated by the arrow are paid to the disk outlet receiver 11*u* through the disk outlet port 11.

Simultaneously, one point is added to the game point total, and the resultant game point total appears on the display device 12.

(Step 9)

If the next step, to which processing is to proceed as a result of occurrence of a slot winning, does not correspond to a check point step, processing proceeds to the next step, and the game lamp 19 assigned to the step is illuminated.

The disk table 3 enters a tilt mode (see FIG. 3B). As shown in FIG. 3D, the winning gates 10, 10 sustain the normal tulip mode.

Disks 1*m* equal in number to the step to which processing has proceeded; that is, ten disks 1*m*, are paid through the disk payout port 8 of the disk supply apparatus.

As shown in FIG. 13C, the thus-paid disks 1*m* slide over the transparent plate 9 and drop as if spit out from the mouth of the lion character 7c5. The thus-dropped disks 1m further slide over the disk table 3 and over the disk slide wall 1w2.

As shown in FIG. 4A, of the disks 1m which slide over the disk slide wall 1w2, any disks 1m which pass through the space between the winning gates 10, 10 indicated by the arrow are paid to the disk outlet receiver 11u through the disk outlet port 11. Thus, the player acquires the disks 1m.

Simultaneously, one point is added to the game point total, and the resultant game point total appears on the display device 12.

(Step 10)

A determination is made as to whether the arrived step corresponds to the final step.

(Step 11)

If the arrived step corresponds to the final step, the number of step of the game shifts to step 0 (see FIG. 10), and all the game lamps 19 are extinguished.

Then, processing returns to (step 1).

Progress in a game has been described, and the following may be adopted as a slot winning pattern and an advance notice of slot winning, as required.

In case of employment of only a virtual image as an advance notice of winning, a back screen is changed by employing the virtual image, or a character performs a little action.

A character or background screen implying slot winning is displayed as a slot winning pattern, regardless of motion of the mechanical reel portion 6. For instance, something comes out of a castle; the sky becomes dark gradually; clouds come out; or thunder sounds. Further, the background screen can be represented that the winning gradually comes closer to the player, through use of a virtual image.

A slot winning pattern for the mechanical reel portion 6 maybe applied in various manners. For instance, the spinning drums which are spinning at high speed are suddenly stopped; the spinning speed of the drums of the mechanical reel portion 6 is gradually decreased, to thereby cause the player to realize occurrence of winning; or the drums 6d1, 6d2, and 6d3 of the mechanical reel portion 6 are caused to go back by an amount corresponding to one symbol or number, as required.

An advance notice for slot winning, a virtual image used as a slot winning pattern, and the slot winning motion of the mechanical reel portion 6 may be combined.

A virtual image pertaining to checkpoint steps indicated by the game lamps 19 may be arranged so as to constitute a four-part constitution (stories), as required. For example, the virtual image is imparted with a story by means of taking step 3 as an introduction, step 6 as a development, step 9 as a turn, and step 12 as a conclusion. A virtual image (i.e., a background or characters) are changed for each check point, thereby preventing a player from growing bored of playing a game.

As mentioned above, the gaming machine 1 displays several kinds of images having stories, thereby imparting an expectation or feeling of achievement to the player in association with progress in a story. Thus, in terms of a display, the gaming machine 1 has a game entertainment characteristic, which would not be implemented by a gaming device having only a mechanical slot display section.

In the present embodiment, the number "777" has been set as a jackpot combination. In addition, the numbers "333" and "555" may be set to winnings higher in rank than other slot winnings. An event game, such as a slot chance, may be provided to a player as a game point.

The sizes of displays or symbols of the mechanical reel portion 6 may be enhanced with the number "777" being taken as the largest, the numbers "333" and "555" being taken as the second largest, and remaining triple numbers being taken as the third largest.

Only numbers are on the mechanical reel portion 6. However, symbols may be employed in the form of numbers. Alternatively, symbols maybe employed without use of numbers, or symbols and numbers may be combined together.

As a matter of course, the winning gates 10 can be constructed in another form other than the above-described form, so long as the number of disks 1m which pass through the winning gates 10, 10.

In the virtual image/real image superimposing and displaying apparatus according to the present invention, virtual-image characters are caused to emerge from the inside of the mechanical reel portion: that is, a deeper position in the dark color section of the mechanical reel portion 6. Presentation is made as if characters have emerged from the inside of the mechanical reel portion 6. Thus, expression of the display section can be made fertile by utilization of three-dimensionality of an actual substance.

A virtual image and an actual substance are expressed so as to become associated with each other, by means of causing a virtual-image character to start spinning a mechanical reel portion or causing a virtual-image character to stop spinning of the mechanical reel portion. A virtual image and an actual substance can be combined together.

The mouth of a lion which is a virtual-image character is set in a boundary between the virtual image and a disk to be paid out. Therefore, the disk can be expressed as being paid out from the mouth of a lion. By means of expressing a virtual image and an actual substance in combination, an expression having virtual impact can be provided.

Any one of the spinning drums of the mechanical reel portion is made dark, and a virtual image is displayed in the drum. The player plays a slot game through use of two spinning drums, thereby enabling execution of a slot game having a high probability of occurrence of slot winning.

Alternatively, any two of the spinning drums of the mechanical reel portion are made dark, and virtual images are displayed on the drums. The remaining one drum is caused to spin, and a number displayed by the drum when stopped is assigned a rank beforehand. A game point is provided to the player by means of a displayed number, thus enabling the player to play a game advantageous over a slot game.

A variety of games can be implemented by means of applying a mechanical reel portion and a virtual image to the display section.

As mentioned above, since the virtual image and the actual image as the mechanical reel portion are superimposed and displayed, the fantasy which the virtual image has and the reality which the actual mechanical reel portion has are combined together. Therefore, there is possible to provide a jackpot trigger pattern having presence.

As mentioned above, a virtual image/real image superimposing and displaying apparatus which enables fusion of an image and an actual substance, by means of combining together the fantasy of an image and the three-dimensionality and realism of an actual substance.

In the slot machine according to the present invention, virtual-image characters are caused to emerge from a deep position in a dark color section of the mechanical reel portion: that is, the inside of the mechanical reel portion. Presentation is effected as if characters have emerged from the inside of the mechanical reel portion, thereby providing a slot gaming apparatus having a display section.

There is provided a slot machine having a display section capable of displaying a virtual image and an actual substance in combination, by means of causing the virtual image and the actual substance to cooperate with each other: for example, a virtual-image character starts spinning the drums of the mechanical or stops spinning of the drums of the mechanical reel portion.

There is provided a slot machine which enables a expression having virtually impact, by means of setting the mouth of a lion which is a virtual-image character in a boundary between the virtual image and a disk to be paid out so that a disk can be expressed as being paid out from the mouth of a lion.

Any one of the drums of the mechanical reel portion is hidden by use of a virtual image, and the player plays a slot game through use of two drums, thereby enabling playing of a slot game having a high probability of occurrence of slot winning.

Alternatively, any two of the drums of the mechanical reel portion are hidden by use of a virtual image. The remaining one drum is caused to spin, and a number displayed by the drum when stopped is assigned a rank beforehand. A game point is provided to the player by means of a displayed number, thus enabling the player to play a game advantageous over a slot game.

There is provided a slot machine which enables a player to play a variety of games, by means of applying a mechanical reel portion and a virtual image to the display section.

There is also provided a slot machine which enables realization of a jackpot trigger pattern having an enriched sense of realism by combining the virtual image and the mechanical reel portion as the actual substance.

Hence, there is provided a slot machine having a virtual image/real image superimposing and displaying apparatus, which apparatus enables fusion of an image and an actual substance, by means of combining together the fantasy of an image and the three-dimensionality and realism of an actual substance.

The number of disks to be paid out is increased or decreased in accordance with a kind of slot winning. A game player can enjoy playing a slot game with an expectation of occurrence of a slot winning of higher rank.

There is provided a slot machine having open-closable winning gates through which disks to be paid out pass. The slot machine pays out disks in various manners, by means of taking the disks having passed through the winning gates as disks acquired by the game player, and of adjusting the amount of disks passing through the winning gates through opening/closing actions of the winning gates.

The degree of opening of the winning gates is changed in accordance with a progress in game, thereby prompting a visual effect of the player and stirring up the passion for gambling. Thereby, the player's interest in game is enhanced, and the continuation of a game can be improved.

In accordance with a kind of slot winning, opening/closing actions of the winning gates are controlled, thereby adjusting the number of disks acquired by a game player. As a result, there is provided a slot machine which enables payout of disks in a variety of manners.

The disk table is pivotally moved in the vertical direction, thus assuming a tilt mode and a horizontal mode. In the tilt mode, disks placed on top of the disk table are paid to the player. In the horizontal mode, the player can shoot a disk into a disk passage slot. By means of causing blinking operation of the time lamps to associate with the horizontal and tilt modes of the disk table, the player can feel a round of play operation rhythm of the gaming machine and play games with agility.

The disk passage slot is moved through parallel movement or rotational movement. If a player has failed to shoot a disk into a disk passage slot which is easy to enable passage of a disk, the player encounters difficulty in collecting the disk. In contrast, if the player has failed to shoot a disk into a disk passage slot which is difficulty to enable passage of a disk, the player readily collects the disk. Thus, a game having a high degree of gambling characteristic can be implemented.

There is provided a slot machine having various slot winning patterns for the mechanical reel portion, by means of adopting at least one from various methods: for example, a method of suddenly stopping the spinning drums which are spinning at high speed; a method of gradually decreasing the spinning speed of the drums of the mechanical reel portion 6; and a method of going back the drums of the mechanical reel portion.

Accordingly, there can be embodied a slot machine which enables fertile video expression through use of a virtual image/real image superimposing and displaying apparatus and which offers improved an entertainment value.

In the previous embodiment, a virtual image/real image superimposing and displaying apparatus is applied to a slot machine. Needless to say, the virtual image/actual substance superimposing and displaying apparatus according to the present invention can be applied to another gaming machine other than a slot machine.

The previous embodiment has illustrated a slot machine of one embodiment. Needless to say, the slot machine according to the present invention can be applied to a gaming machine of another embodiment. For instance, in the previous embodiment, the player acquires the disks as prize values, however, prize tickets, tokens or the like may also be employed as the prize values in the present invention.

As described in detail, the virtual image/real image superimposing and displaying apparatus according to the present invention causes a background of a virtual display area or at least a part of an actual substance display area to be dark, thereby enabling clear display of a virtual image.

A virtual image is displayed in a dark color section which is at least a part of the actual substance display area. The virtual image can be displayed as if it were located in an actual substance, by utilization of a three-dimensionality of an actual substance. Thus, expression of a display section can be made fertile.

Movement of an actual substance is cooperated with a virtual image, thereby enabling fusion of the virtual image and the actual substance and to provide a video expression having visually impact.

An actual substance is moved so as to penetrate through a virtual image from its back to front. Thus, the player can view the actual substance when the actual substance moves to the front side of the virtual image, or an actual substance and a virtual image, which effect movement, are superimposed one on another and displayed. Therefore, enabling realistic expression can be provided.

Accordingly, there can be provided a virtual image/actual substance superimposing and displaying apparatus which enables fusion of an image and an actual substance, by means of combining the fantasy of an image and the three-dimensionality and realism of an actual substance.

There is provided a slot machine according to the present invention, wherein a disk is paid out so as to penetrate through a virtual image from its back to front, and the player is visually ascertained the disk only when the disk moves to a front side of the virtual image, thus enabling to provide payout action and video expression having visually impact.

There is provided a slot machine which enables combined expression of a virtual image and an actual substance and realistic video expression, by controlling movement of a mechanical reel portion in cooperation with a virtual image.

There can be effected a game using a mechanical reel portion having diversity, wherein at least one of drums of the mechanical reel portion is made dark, and a virtual image is displayed on the drum, thus enabling the player to play a slot game through use of two drums or one drum.

A game step is indicated by use of a plurality of game lamps, and a virtual image is changed in accordance with illumination of the game lamps. As a result, a player is caused to harbor an expectation or a sense of achievement by means of an indication expressed by a virtual image. Further, an insatiable game scenario can be prepared.

There is provided start check means for commencing spinning of a mechanical reel portion, and diversity is As imparted to a method of causing a disk to pass through the start check means, thus effecting a game of higher gambling characteristic.

The disk table member is vertically pivoted around a fulcrum, thereby assuming a tilt mode and a horizontal mode. In the tilt mode, disks placed on top of the disk table are paid to the player. In the horizontal mode, the player can shoot a disk into a disk passage slot. By means of causing blinking operation of the time lamps to associate with the horizontal and tilt modes of the disk table, the player can feel a round of play operation rhythm of the gaming machine and play games with agility.

There is also provided a slot machine having gate unit for controlling the amount of payout disks passing through the gate unit, and gate open/close controller. The amount of disks passing through the gate unit is adjusted in accordance with a progress in game, thereby paying disks in a versatile manner.

There is provided a slot machine which a game player plays a game with a great expectation of slot winning, by means of controlling the amount of disks passing through the gate unit in accordance with a kind of slot winning.

There can be realized a slot machine which enables fertile video expression through use of a virtual image/real image superimposing and displaying apparatus and offers an improved entertainment value.

What is claimed is:

1. A virtual image/real image superimposing and displaying apparatus for displaying a virtual image and an actual substance, comprising:

an image display for displaying an image which is a original of the virtual image;

a half mirror which forms the virtual image on the basis of the image displayed by the image display; and a junction section which enables movement of the actual substance from a back side of the virtual image to a front side of the virtual image so as to penetrate therethrough, wherein the actual substance becomes visible only when the actual substance is moved to a front side of the virtual image.

2. The virtual image/real image superimposing and displaying apparatus according to claim 1, wherein a background of a virtual image display area in which the virtual image is displayed front of the actual substance is of dark color.

3. A virtual image/real image superimposing and displaying apparatus for displaying a virtual image and an actual substance, comprising:

an image display for displaying an image which is a original of the virtual image;

a half mirror which forms the virtual image on the basis of the image displayed by the image display;

an actual substance which is disposed so as to extend from a front side of the virtual image to a back side of the virtual image;

an actual substance display area in which a predetermined portion of the actual substance is disposed front of the virtual image;

a virtual image display area in which the virtual image is disposed front of another portion of the actual substance; and an image controller for moving an image of the virtual image between the actual substance display area and the virtual image display area.

4. The virtual image/real image superimposing and displaying device according to claim 3, wherein a background of a virtual image display area in which the virtual image is displayed front of the actual substance is of dark color.

5. The virtual image/real image superimposing and displaying device according to claim 3, further comprising:

a dark color section provided in at least a portion of the actual substance display area in which a predetermined portion of the actual substance is disposed front of the virtual image, wherein the virtual image is displayed on the dark color section.

6. A virtual image/real image superimposing and displaying apparatus for displaying a virtual image and an actual substance, comprising:

an image display for displaying an image which is a original of the virtual image;

a half mirror which forms the virtual image on the basis of the image displayed by the image display;

an actual substance which is disposed so as to extend from a front side of the virtual image to a back side of the virtual image;

an actual substance display area in which a predetermined portion of the actual substance is disposed front of the virtual image; and a controller for controlling the movement of the actual substance in cooperation with the virtual image.

7. The virtual image/real image superimposing and displaying device according to claim 6, wherein a background of a virtual image display area in which the virtual image is displayed front of the actual substance is of dark color.

8. The virtual image/real image superimposing and displaying device according to claim 6, further comprising:

a dark color section provided in at least a portion of the actual substance display area in which a predetermined portion of the actual substance is disposed front of the virtual image, wherein the virtual image is displayed on the dark color section.

9. A slot machine which pays prize values when combination of a plurality of marks represents a winning combination, comprising:

an image display for displaying an image which is a original of a virtual image;

a half mirror which forms the virtual image on the basis of the image displayed by the image display;

a junction section enables movement of prize values from a back side of the virtual image to a front side of the virtual image so as to penetrate therethrough; and a mechanical reel portion having a plurality of spinning drums, each of the spinning drums having the plurality of marks representing at least one of numbers and symbols, printed on a circumferential surface thereof and spinning independently, wherein the prize values are paid from a back side of the virtual image to a front side of the virtual image so as to penetrate through the virtual image, and the prize values become visible only when moving to the front side of the virtual image.

10. The slot machine according to claim 9, wherein the mechanical reel portion is disposed so as to extend from the front side of the virtual image to the back side of the same, and movement of the mechanical reel portion is controlled by a reel controller in cooperation with the virtual image.

11. The slot machine according to claim 9, further comprising:

a image controller which causes at least one of the spinning drums of the mechanical reel portion to be dark and displays the virtual image on the spinning drums.

12. The slot machine according to claim 9, further comprising:

a plurality of lamps, each of which defines number of payout prize values, the plurality of lamps being illuminated when the plurality of marks includes a winning combination.

13. The slot machine according to claim 12 further comprising a changing image controller for changing the image in response to illumination of the lamps.

14. A slot machine which pays prize values when a plurality of marks includes a winning combination, comprising:

a gate unit placed in a channel through which the prize values are paid out; and a gate open/close controller for controlling opening and closing action of the gate unit in accordance with progress in a game, wherein the prize values passed through the gate unit are offered to a game player.

15. The slot machine according to claim 14, wherein the game open/close controller controls opening and closing action of the gate unit in accordance with the kind of a winning combination included in the plurality of marks.

16. A slot machine which pays prize values when a plurality of marks has included a winning combination, comprising:

a disk shooter through which a game player shoots a disk;

a start checker unit which allows passage of the disk in a case of a hit of the shot disk and blocks passage of the disk in case of failure of hit of the shot disk;

a passage detector for detecting passage of the disk; and a drum spinning controller which starts spinning of drums of the slot machine when passage of the disk is detected.

17. The slot machine according to claim 16, wherein the start checker unit has a start checker which has a plurality of openings and moves in a direction crossing a direction in which a disk is inserted, the openings located close to a disk non-return passage being wide and the openings located close to a disk return passage being narrow.

18. The slot machine according to claim 16, further comprising a table member which is disposed between the start checker unit and the disk shooter and can be switched between a horizontal state for guiding a rolling disk to the start check unit and a tilt state for guiding a tipped disk to the disk return passage and the disk non-return passage.

19. The slot machine according to claim 18, further comprising a time lamp for indicating whether the table member is in a horizontal state or a tilt state.

20. The slot machine according to claim 19, wherein a plurality of lamps are provided as the time lamp, and the number of time lamps illuminated is associated with the tilt state of the table member.

* * * * *